United States Patent
Sasaki et al.

(10) Patent No.: US 7,532,750 B2
(45) Date of Patent: May 12, 2009

(54) IMAGE PROCESSING APPARATUS AND METHOD, PROGRAM, AND IMAGE PROCESSING SYSTEM

(75) Inventors: Daichi Sasaki, Tokyo (JP); Takahiro Ishii, Tokyo (JP); Naosuke Asari, Chiba (JP)

(73) Assignee: Sony Corporation, Tokyo (JP)

( * ) Notice: Subject to any disclaimer, the term of this patent is extended or adjusted under 35 U.S.C. 154(b) by 780 days.

(21) Appl. No.: 10/411,789

(22) Filed: Apr. 11, 2003

(65) Prior Publication Data

US 2003/0220562 A1 Nov. 27, 2003

(30) Foreign Application Priority Data

Apr. 17, 2002 (JP) ............................. 2002-114261
Oct. 8, 2002 (JP) ............................. 2002-294474

(51) Int. Cl.
*G06K 9/00* (2006.01)
*G06K 9/36* (2006.01)
*G06K 9/54* (2006.01)
*G06T 15/10* (2006.01)
*G06T 15/20* (2006.01)

(52) U.S. Cl. ..................... 382/154; 382/131; 382/276; 382/304; 345/427

(58) Field of Classification Search ................. 382/131, 382/132, 154, 276, 285, 302–304; 345/424, 345/427; 600/425
See application file for complete search history.

(56) References Cited

U.S. PATENT DOCUMENTS

| | | | | |
|---|---|---|---|---|
| 4,910,669 A | * | 3/1990 | Gorin et al. | 712/17 |
| 5,224,100 A | * | 6/1993 | Lee et al. | 370/408 |
| 5,333,268 A | * | 7/1994 | Douglas et al. | 709/244 |
| 5,546,943 A | * | 8/1996 | Gould | 600/425 |
| 5,590,284 A | * | 12/1996 | Crosetto | 712/29 |
| 5,701,403 A | * | 12/1997 | Watanabe et al. | 345/419 |
| 5,768,594 A | * | 6/1998 | Blelloch et al. | 717/149 |
| 5,839,440 A | * | 11/1998 | Liou et al. | 600/431 |
| 6,002,738 A | * | 12/1999 | Cabral et al. | 378/4 |
| 6,559,843 B1 | * | 5/2003 | Hsu | 345/421 |
| 6,844,877 B1 | * | 1/2005 | Rajkumar et al. | 345/420 |
| 2002/0154801 A1 | * | 10/2002 | Ohishi | 382/132 |
| 2002/0167517 A1 | * | 11/2002 | Sato | 345/424 |

FOREIGN PATENT DOCUMENTS

JP 63-102748 5/1988

(Continued)

OTHER PUBLICATIONS

Drebin et al. ("Volume Rendering", SIGGRAPH, vol. 22, No. 4, Aug. 1988, pp. 65-74).*

*Primary Examiner*—Yubin Hung
(74) *Attorney, Agent, or Firm*—K & L Gates LLP

(57) ABSTRACT

An image processing apparatus and method produce sectional image data of a specimen in an arbitrary direction without deterioration of picture quality. A re-construction process produces volume data such that one of coordinate axes of a volume coordinate system such as the z axis is aligned with the principal axis of inertia of a specimen. When sectional image data of the specimen on a certain section are to be produced, from among all voxels which compose the volume data, those voxels whose z coordinates have predetermined values are read out, and the read out voxels are regarded as pixels. As a result, it is not necessary to interpolate pixels, and the deterioration of picture quality arising from interpolation of pixels is prevented.

17 Claims, 24 Drawing Sheets

FOREIGN PATENT DOCUMENTS

| | | |
|---|---|---|
| JP | 63-135141 | 6/1988 |
| JP | 01-209583 | 8/1989 |
| JP | 03-209119 | 9/1991 |
| JP | 09-016805 | 1/1997 |
| JP | 10-040414 | 2/1998 |
| JP | 2000-123194 | 4/2000 |
| JP | 2000-195610 | 7/2000 |
| JP | 2001-167251 | 6/2001 |
| JP | 2001-195610 | 7/2001 |
| JP | 2001-330568 | 11/2001 |
| JP | 2002-267622 | 9/2002 |
| JP | 2000-293709 | 10/2002 |

* cited by examiner

PRIOR ART

PRIOR ART

PRIOR ART

F I G. 1 3
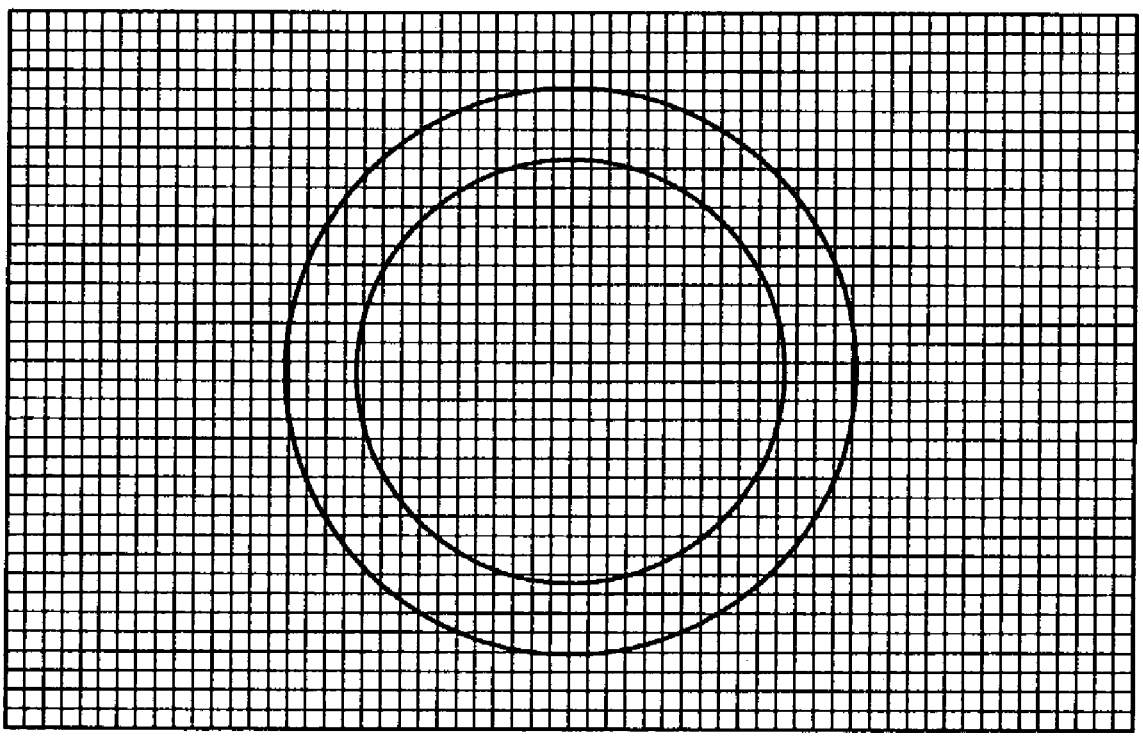

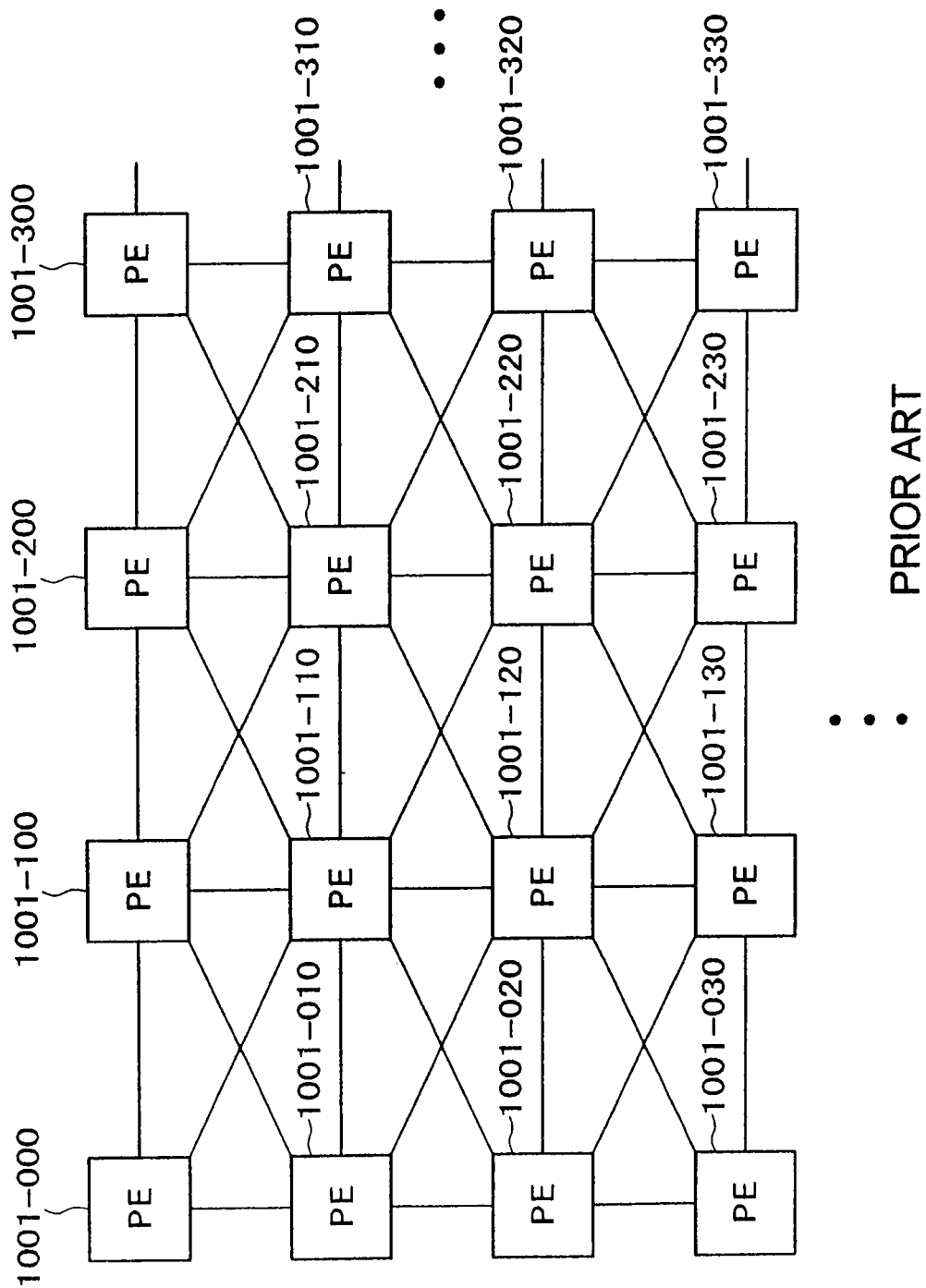

F I G. 1 5
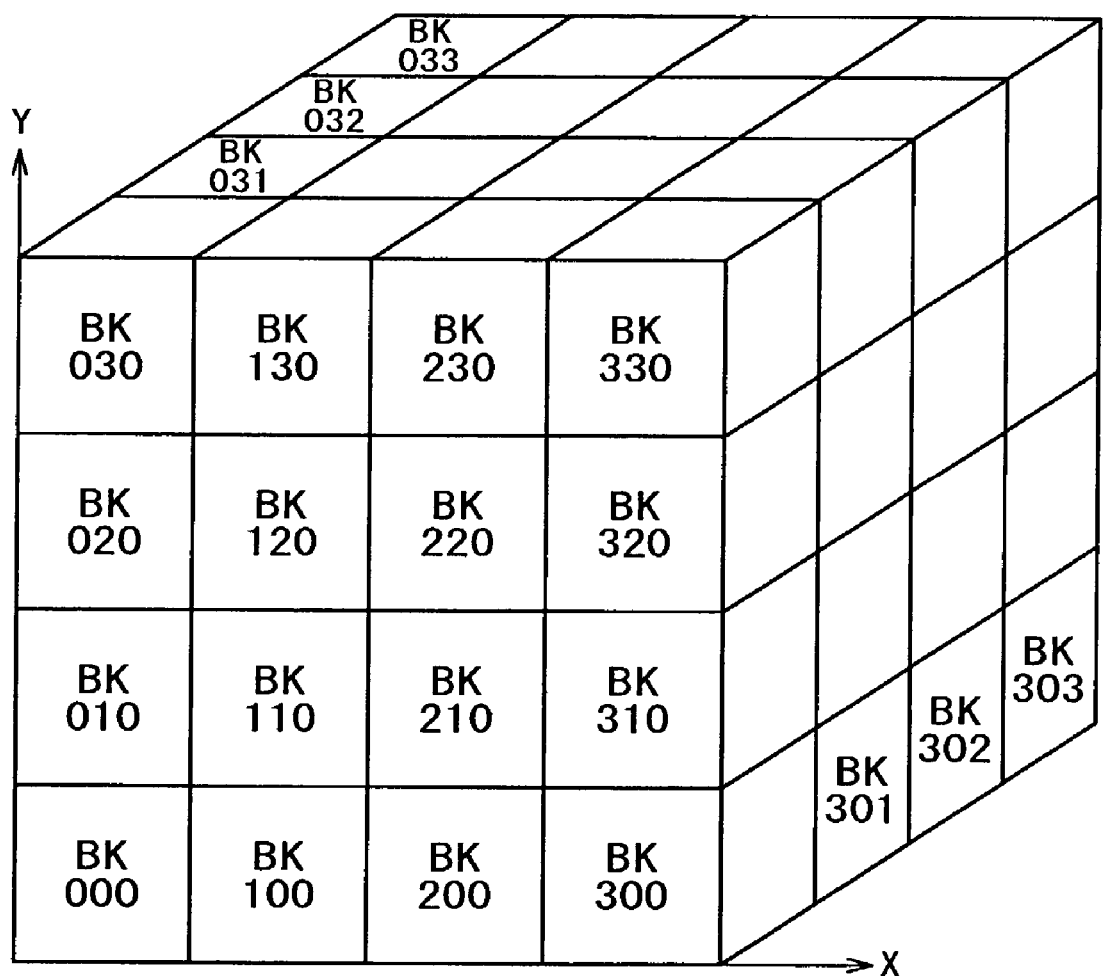

F I G. 1 8
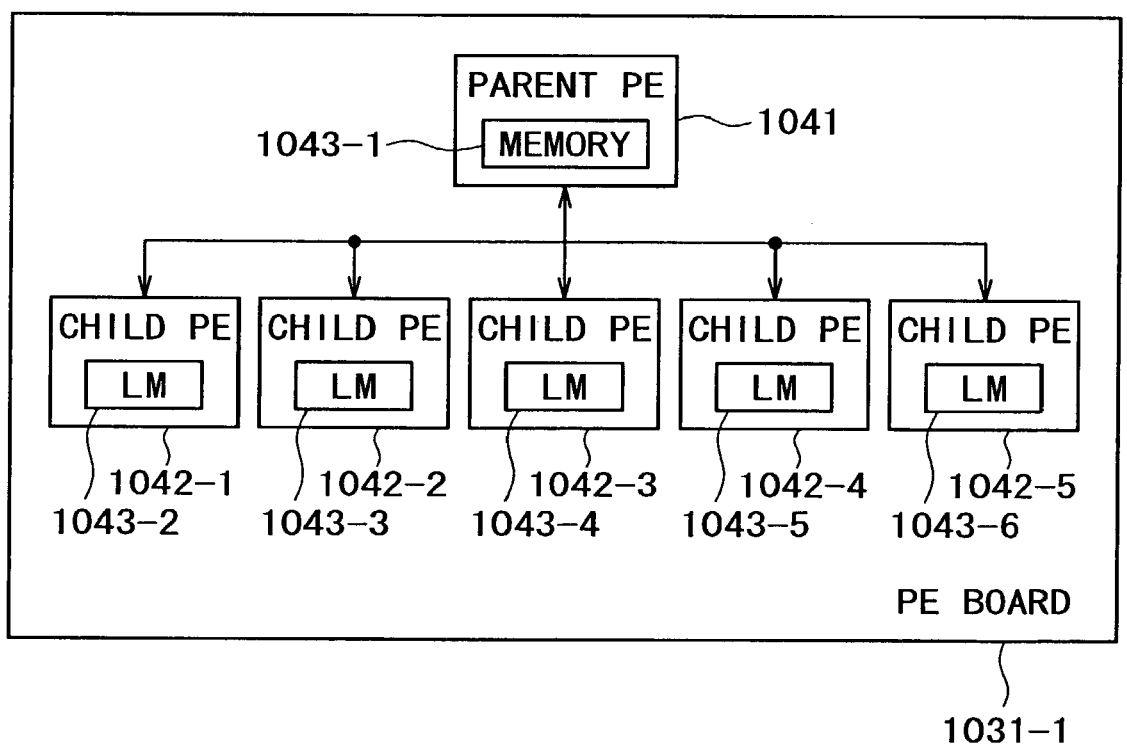

FIG. 21A
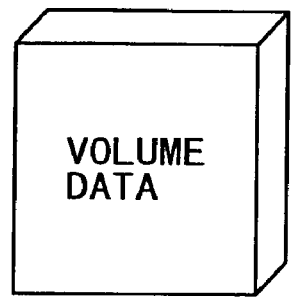
FIG. 21B
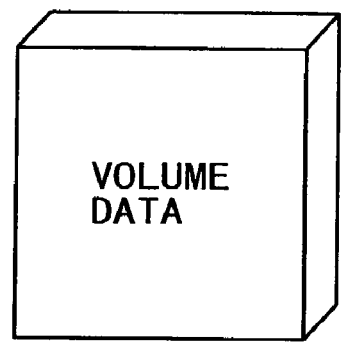
FIG. 21C
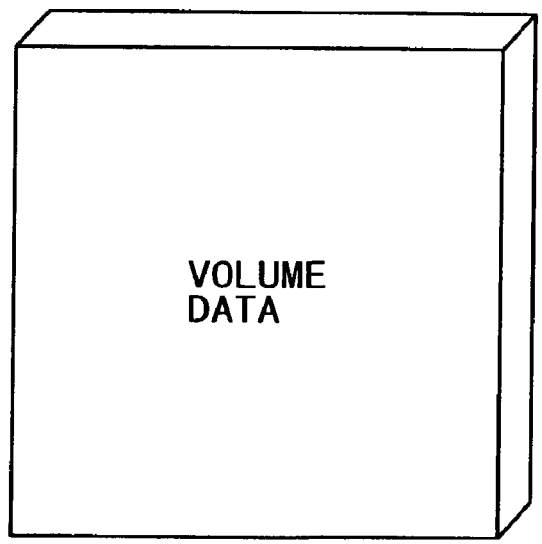

IMAGE PROCESSING APPARATUS AND METHOD, PROGRAM, AND IMAGE PROCESSING SYSTEM

BACKGROUND OF THE INVENTION

This invention relates to an image processing apparatus and method, a recording medium, and a program, and more particularly to an image processing apparatus and method, a recording medium, and a program suitable for use to produce, based on projection image data acquired using, for example, an X-ray single scan cone beam, sectional image data of a specimen in an arbitrary direction. The present invention further relates to an image processing apparatus and method, a recording medium, and a program wherein plotting of a three-dimensional body is performed in parallel by processing of a plurality of processors to reduce the period of time required for the plotting process.

In recent years, in various fields such as medical and industrial fields, a three-dimensional X-ray CT (Computerized Tomography) system by which sectional image data of a specimen can be acquired has been utilized. FIG. 1 shows an example of a configuration of a conventional three-dimensional X-ray CT system. Referring to FIG. 1, the three-dimensional X-ray CT system shown includes an X-ray source 2 for illuminating a single scan beam upon a specimen 1, a rotary table 3 for rotating the specimen 1 by 360 degrees, a light reception section 4 for receiving the X-ray having passed through the specimen 1 to produce projection image data, and an image processing apparatus 5 for producing sectional image data of the specimen 1 based on a plurality of projection image data from circular omnidirections. It is to be noted that also another system is available wherein the specimen is fixed while the X-ray source and the light reception section revolve around the specimen.

Action of the conventional three-dimensional X-ray CT system is described with reference to FIG. 2. In an X-ray projection process by the X-ray source 2, rotary table 3 and light reception section 4, every time the rotational angle of the rotary table 3 changes, projection image data is produced. In a re-construction process by the image processing apparatus 5, volume data (which is formed from a plurality of voxels which are cubic lattice elements of a size which contains the specimen 1 and have X-ray absorption coefficients at individual sample points) is produced based on a plurality of projection image data. Usually, the three-dimensional coordinate system for volume data is set in parallel to the two-dimensional coordinate system of projection image data in order to reduce the amount of arithmetic operation.

It is to be noted that a method of producing volume data corresponding to a specimen based on a plurality of projection image data is disclosed, for example, in Toru SASAKI and one other, "Reconstruction of a three-dimensional X-ray CT image using a distributed memory type multi-processor system", the Journal of the Information Processing Society of Japan, vol.38, No.9, 1997.

In a sectional image data production process by the image processing apparatus 5, sectional image data on an arbitrary section are produced based on the volume data. For example, in order to produce, based on volume data represented by an xyz coordinate system shown in FIG. 3, sectional image data on a section A perpendicular to the z axis, from among all voxels which form the volume data, those voxels which are present on a plane whose z coordinate has a predetermined value should be read out. This process can be executed very readily. The section A perpendicular to the z axis is occupied by existing voxels as seen in FIG. 4. Accordingly, the sectional image data on the section A can be produced regarding the existing voxels as pixels.

Incidentally, if the rotary table 3 and the specimen 1 are disposed in a state wherein the axis of rotation of the rotary table 3 and the principal axis of inertia of the specimen 1 do not extend in parallel to each other as seen in FIG. 3, then none of the x, y and z axes of the coordinate system of the volume data produced by a re-construction process extends in parallel to the principal axis of inertia of the specimen 1 as seen in FIG. 3.

In such an instance, it is much more cumbersome to produce sectional image data on a section B which does not extend perpendicularly to any one of the x, y and z axes of the volume data but extends perpendicularly to the principal axis of inertial of the specimen 1 than to acquire sectional image data on the section A. In particular, arithmetic operation of coordinates of the section B is cumbersome, and besides, the density of voxels existing on the section B is lower than the density of voxels existing on the section A shown in FIG. 4 as seen in FIG. 5. Accordingly, in order to produce sectional image data of the section B, it is necessary to interpolate pixels using the closest interpolation, the bilinear interpolation or some other interpolation which use existing voxels. Consequently, the picture quality of the sectional image data of the section B is deteriorated by the interpolation.

As described above, where the rotary table 3 and the specimen 1 are not disposed such that the axis of rotation of the rotary table 3 and the principal axis of inertia of the specimen 1 do not extend in parallel to each other as seen in FIG. 1, although it is impossible to produce sectional image data of a section (such as, for example, the section B) perpendicular to the principal axis of inertia of the specimen 1, there is a subject to be solved that the picture quality of the thus produced sectional image data is deteriorated.

It is to be noted that, if voxels of volume data are produced in a higher density in a re-construction process, then naturally it is not necessary to interpolate pixels when sectional image data on the section B are produced, and the picture quality of sectional image data produced is not deteriorated. However, there is a subject to be solved that, if the density of voxels of volume data is further raised, then the amount of arithmetic operation in a reconfiguration process increases and the data size of the volume data increases.

Meanwhile, in recent years, in various fields such as medical and industrial fields, a three-dimensional body (hereinafter referred to as specimen) is sometimes plotted three-dimensionally based on volume data (three-dimensional coordinates of sample points which form the three-dimensional body and scalar values of a predetermined item or items at the sample points) of the three-dimensional body acquired by the three-dimensional X-ray CT technique, the MRI (Magnetic Response Imaging) technique or the like. In a process of three-dimensionally plotting a specimen based on volume data, the specimen can be plotted from an arbitrary eye point with an arbitrary magnification in response to an operation of a user, and therefore, it is possible to readily grasp a spatial positional relationship of an entire image of the specimen or points in the inside of the specimen, which is difficult to grasp with two-dimensional images such as, for example, X-ray photographs.

Incidentally, a very great amount of arithmetic operation is required for a process of three-dimensionally plotting a specimen based on acquired volume data (the process is hereinafter referred to as volume rendering process). Such a very great amount of arithmetic operation as just mentioned is sometimes distributed to a plurality of processor elements, which cooperatively form a multi-processor unit, so that the processor elements may arithmetically operate in parallel to each other to reduce the processing time.

FIG. 14 shows an example of a configuration of a conventional multi-processor unit. Referring to FIG. 14, the multi-processor unit includes a plurality of processor elements (each represented by PE in FIG. 14) 1001 (1001-000 to 1001-330 in FIG. 14) disposed in a matrix and each connected to eight processor elements 1001 disposed therearound. Arithmetic operation regarding one of such blocks in a three-dimensional space as seen in FIG. 15 is distributed to each of the processor elements 1001. For example, to the processor element 1001-000, arithmetic operation regarding a block BK000 is distributed. Further, to the processor element 1001-010, arithmetic operation regarding the block BK010 is distributed.

Accordingly, where the specimen of an object of the volume rendering process is sufficiently small when compared with, for example, the three-dimensional space composed of 4×4×4 blocks shown in FIG. 15, an arithmetic operation process may not possibly be distributed to some of the processor elements 1001.

In this manner, in a conventional multi-processor unit for use for a volume rendering process, since arithmetic operation is distributed in accordance with a single distribution method, suitable amounts of arithmetic operation are not sometimes distributed to the processor elements. Thus, there is a subject to be solved that the time required for arithmetic operation is not necessarily be reduced, and there is some possibility that the processing time can be further reduced.

Further, where the processor elements are disposed in a lattice like the processor elements 1001 shown in FIG. 14, various data must be communicated individually with the processor elements 1001, there is a subject to be solved that a correspondingly high communication cost (for example, a frequency in which the same data is communicated) is required and the efficiency is not high.

SUMMARY OF THE INVENTION

It is an object of the present invention to provide an image processing apparatus and method, and a program by which sectional image data of a specimen in an arbitrary direction can be produced without deterioration of the picture quality.

It is another object of the present invention to provide an image processing apparatus and method, and a program wherein a great amount of arithmetic operation regarding a volume rendering process is distributed to a plurality of processor elements based on the capacity of volume data and/or the capacity of a local memory built in each of the processor elements to reduce the period of time required for the volume rendering process.

In order to attain the objects described above, according to an aspect of the present invention, there is provided an image processing apparatus for producing volume data based on projection image data of a specimen and producing sectional image data of the specimen based on the volume data, including acquisition means for acquiring the projection image data, setting means for setting at least one of a position of the origin of a coordinate system of the volume data and an inclination of the coordinate system of the volume data, production means for producing the volume data based on the projection image data acquired by the acquisition means in accordance with the setting by the setting means, and readout means for reading out, from among voxels which compose the volume data produced by the production means, those voxels which are positioned on a plane perpendicular to one of coordinate axes of the coordinate system of the volume data and regarding the read out voxels as pixels to produce the sectional image data.

The production means may include conversion means for converting a coordinate parameter of the volume data into a coordinate parameter of the projection image data using a central point movement transform matrix, a center axis alignment transform matrix, an axial rotation transform matrix and a reverse projection transform matrix, filtering means for performing a predetermined filtering process for the projection image data, and addition means for adding, from among the pixels of the plurality of projection image data filtered by the filtering means, those pixels which correspond to the coordinate parameter of the projection image data converted by the conversion means to produce the voxels of the volume data.

According to another aspect of the present invention, there is provided an image processing method for producing volume data based on projection image data of a specimen and producing sectional image data of the specimen based on the volume data, including an acquisition step of acquiring the projection image data, a setting step of setting at least one of a position of the origin of a coordinate system of the volume data and an inclination of the coordinate system of the volume data, a production step of producing the volume data based on the projection image data acquired by the process at the acquisition step in accordance with the setting by the process at the setting step, and a readout step of reading out, from among voxels which compose the volume data produced by the process at the production step, those voxels which are positioned on a plane perpendicular to one of coordinate axes of the coordinate system of the volume data and regarding the read out voxels as pixels to produce the sectional image data.

According to a further aspect of the present invention, there is provided a program or a program recorded on a recording medium for causing a computer, which controls an image processing apparatus for producing volume data based on projection image data of a specimen and producing sectional image data of the specimen based on the volume data, to execute a process including an acquisition step of acquiring the projection image data, a setting step of setting at least one of a position of the origin of a coordinate system of the volume data and an inclination of the coordinate system of the volume data, a production step of producing the volume data based on the projection image data acquired by the process at the acquisition step in accordance with the setting by the process at the setting step, and a readout step of reading out, from among voxels which compose the volume data produced by the process at the production step, those voxels which are positioned on a plane perpendicular to one of coordinate axes of the coordinate system of the volume data and regarding the read out voxels as pixels to produce the sectional image data.

In the information processing apparatus and method and the program, at least one of the position of the origin of the coordinate system of the volume data and the inclination of the coordinate system of the volume data is set, and the volume data are produced based on the acquired projection image data in accordance with the setting. Further, from among the voxels which compose the volume data thus produced, those voxels which are positioned on a plane perpendicular to one of the coordinate axes of the coordinate system of the volume data are read out and regarded as pixels to produce the sectional image data. Consequently, with the information processing apparatus and method and the program, sectional image data of a specimen in an arbitrary direction can be produced without any deterioration of the picture quality.

According to a still further aspect of the present invention, there is provided an image processing apparatus for producing a three-dimensional rendering image corresponding to a specimen using a multi-processor unit in which a plurality of processors which can perform parallel processing are incorporated, including acquisition means for acquiring a capacity of volume data corresponding to the specimen and a capacity of memories corresponding to the processors, selection means for selecting a processing mode based on the capacity of the volume data and the capacity of the memories acquired by the acquisition means, division means for dividing the volume data in accordance with the processing mode selected by the selection means and supplying the divisional volume data to corresponding ones of the processors, and determination means for determining a scan line number of which the processors should take charge in accordance with the processing mode selected by the selection means.

The acquisition means may further acquire at least one of the number of processor unit boards which compose the multi-processor unit and the total number of the processors incorporated in the multi-processor unit, and the selection means may select the processing mode based also on at least one of the number of the processor unit boards and the total number of the processors acquired by the acquisition means. The division means may divide the volume data and/or determine the scan line number of which the processors take charge in accordance with the number of the processor unit boards or the total number of the processors acquired by the acquisition means.

According to a yet further aspect of the present invention, there is provided an image processing method for an image processing apparatus for producing a three-dimensional rendering image corresponding to a specimen using a multi-processor unit in which a plurality of processors which can perform parallel processing are incorporated, including an acquisition step of acquiring a capacity of volume data corresponding to the specimen and a capacity of memories corresponding to the processors, a selection step of selecting a processing mode based on the capacity of the volume data and the capacity of the memories acquired by the process at the acquisition step, a division step of dividing the volume data in accordance with the processing mode selected by the process at the selection step and supplying the divisional volume data to corresponding ones of the processors, and a determination step of determining a scan line number of which the processors should take charge in accordance with the processing mode selected by the process at the selection step.

According to a yet further aspect of the present invention, there is provided a program or a program recorded on a recording medium for causing a computer, which produces a three-dimensional rendering image corresponding to a specimen using a multi-processor unit in which a plurality of processors which can perform parallel processing are incorporated, to execute an acquisition step of acquiring a capacity of volume data corresponding to the specimen and a capacity of memories corresponding to the processors, a selection step of selecting a processing mode based on the capacity of the volume data and the capacity of the memories acquired by the process at the acquisition step, a division step of dividing the volume data in accordance with the processing mode selected by the process at the selection step and supplying the divisional volume data to corresponding ones of the processors, and a determination step of determining a scan line number of which the processors should take charge in accordance with the processing mode selected by the process at the selection step.

In the image processing apparatus and method and the program, the capacity of the volume data corresponding to the specimen and the capacity of the memories corresponding to the processors are acquired, and a processing mode is selected based on the capacity of the volume data and the capacity of the memories thus acquired. Further, the volume data are divided in accordance with the selected processing mode and supplied to corresponding ones of the processors, and the scan line number of which the processors should take charge is determined in accordance with the selected processing mode. Consequently, with the image processing apparatus and method and the program, the time required for the volume rendering process can be reduced.

The above and other objects, features and advantages of the present invention will become apparent from the following description and the appended claims, taken in conjunction with the accompanying drawings in which like parts or elements denoted by like reference symbols.

BRIEF DESCRIPTION OF THE DRAWINGS

FIG. 13 is a diagrammatic view illustrating the process at step S3 of FIG. 8;

FIG. 14 is a block diagram showing an example of a configuration of a conventional multi-processor unit;

FIG. 15 is a diagrammatic view showing blocks which are set in a three dimensional space and processed individually by processor elements shown in FIG. 14;

FIG. 18 is a block diagram showing an example of a configuration of a processor element board shown in FIG. 17;

FIGS. 21A, 21B and 21C are diagrammatic views illustrating comparison of capacities of volume data to which different rendering modes A to C are applied;

DETAILED DESCRIPTION OF THE PREFERRED EMBODIMENTS

Figure 6:
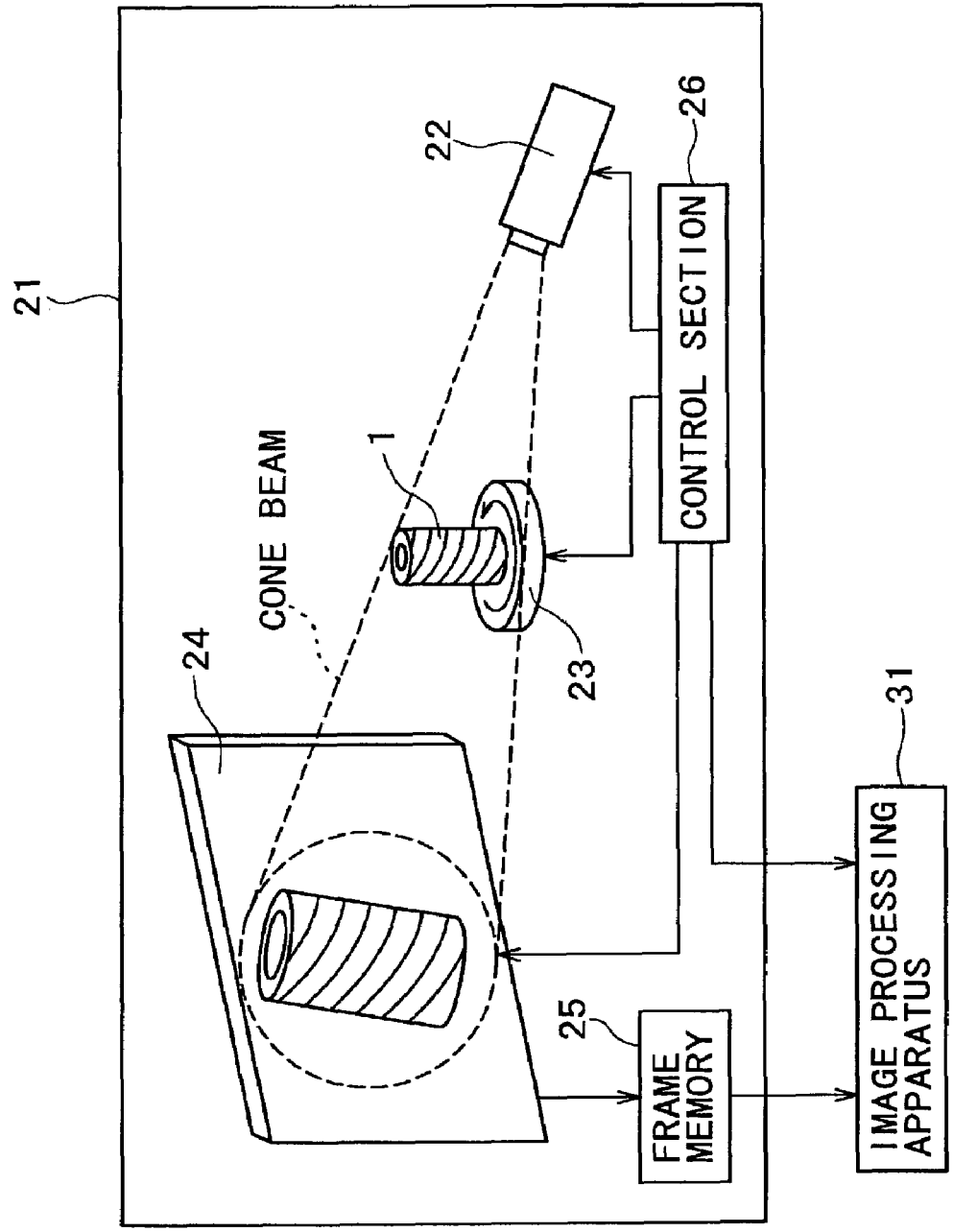
FIG. 6 is a schematic and diagrammatic view showing an example of a configuration of a three-dimensional X-ray CT system to which the present invention is applied.

Referring to FIG. 6, there is shown an example of a configuration of a three-dimensional X-ray CT system to which the present invention is applied. The three-dimensional X-ray CT system includes an X-ray projection apparatus 21 for producing projection image data of a specimen 1 from circular omnidirections, and an image processing apparatus 31 for producing volume data based on a plurality of projection image data (data of a plurality of projection images) from the circular omnidirections and producing arbitrary sectional image data of the specimen 1 based on the produced volume data.

The X-ray projection apparatus 21 includes a rotary table 23 for receiving and rotating the specimen 1 placed thereon, an X-ray source 22 for illuminating an X-ray single scan cone beam upon the specimen 1 placed on the rotary table 23, a two-dimensional light reception section 24 for receiving the X-ray having passed through the specimen 1 to produce projection image data, a frame memory 25 for storing the produced projection image data, and a control section 26 for controlling the illumination timing of the X-ray source 22, the rotational angle of the rotary table 23 and the light reception timing of the two-dimensional light reception section 24.

The control section 26 controls the X-ray source 22, rotary table 23 and two-dimensional light reception section 24 so that projection image data may be produced every time the rotational angle of the rotary table 23 changes. For example, where the rotational angle of the rotary table 23 is changed by one by one degree, 360 projection image data are produced. It is to be noted that the two-dimensional light reception section 24 outputs the projection image data produced thereby to the frame memory 25 together with a rotational angle a of the rotary table 23 from a reference position conveyed thereto from the control section 26.

Figure 7:
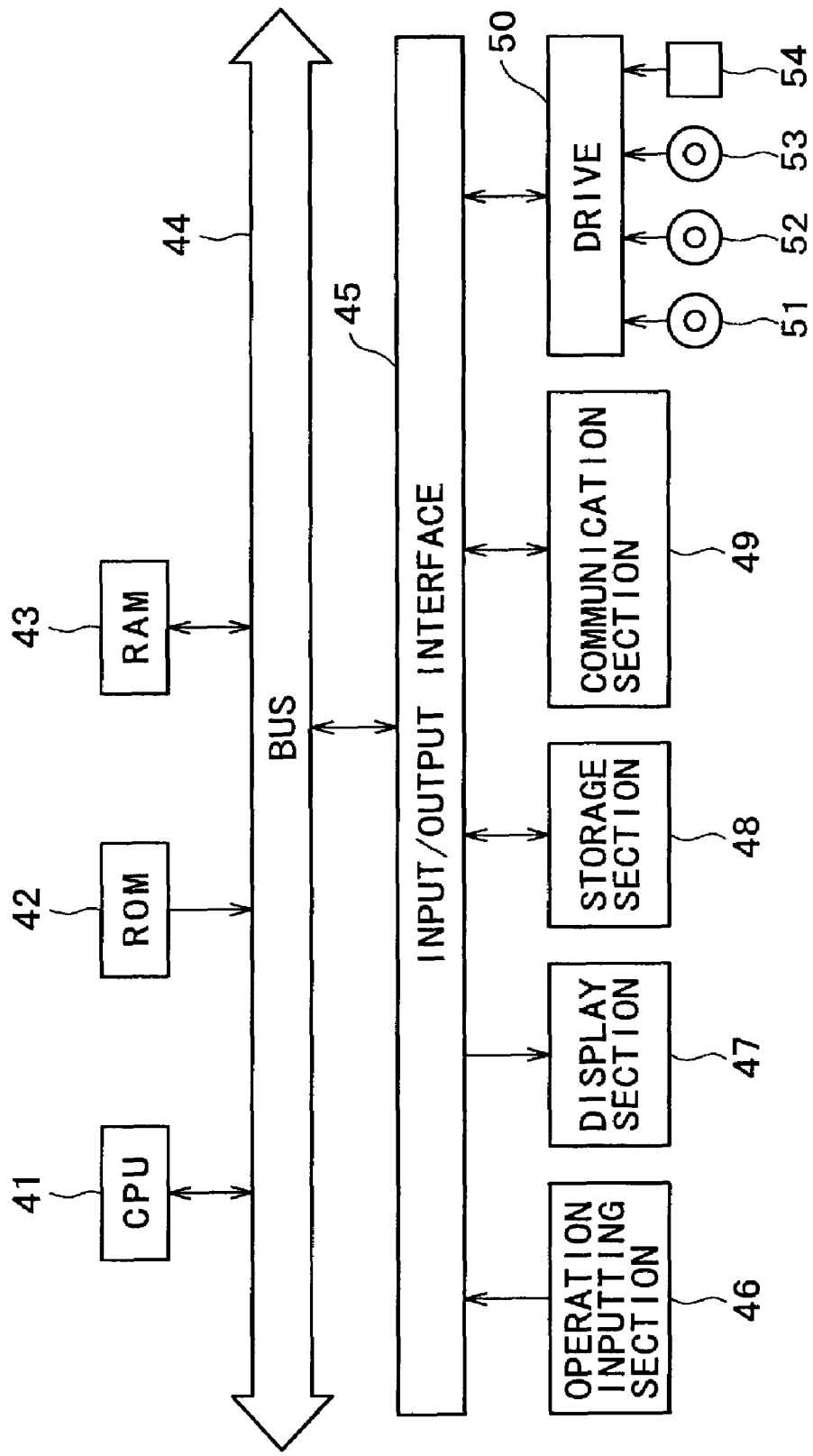
FIG. 7 is a block diagram showing an example of a configuration of a personal computer which implements an image processing apparatus shown in FIG. 6.

FIG. 7 shows an example of a configuration of a personal computer which acts as the image processing apparatus 31 by executing a predetermined program which is hereinafter referred to as image processing program. Referring to FIG. 7, the personal computer shown includes a built-in CPU (Central Processing Unit) 41. An input/output interface 45 is connected to the CPU 41 by a bus 44. A ROM (Read Only Memory) 42 and a RAM (Random Access Memory) 43 are connected to the bus 44.

Connected to the input/output interface 45 are an operation inputting section 46 including input devices such as a keyboard and a mouse for being operated by the user to input an operation command, a display section 47 in the form of a CRT (Cathode Ray Tube), an LCD (Liquid Crystal Display) unit or the like for displaying an image of sectional image data produced based on volume data, a storage section 48 in the form of a hard disk drive or the like for storing the image processing program, projection image data, volume data, sectional image data and other necessary data, and a communication section 49 for being connected to the X-ray projection apparatus 21 to acquire projection image data recorded in the frame memory 25. Also a drive 50 for writing and reading out data into and from a recording medium such as a magnetic disk 51, an optical disk 52, a magneto-optical disk 53 or a semiconductor memory 54 is connected to the input/output interface 45.

The image processing program for causing the personal computer to execute action as the image processing apparatus 31 has been supplied to the personal computer in a state stored on a magnetic disk 51 (including a flexible disk), an optical disk 52 (including a CD-ROM (Compact Disc-Read Only Memory) and a DVD (Digital Versatile Disc)) or a magneto-optical disk 53 (including an MD (Mini Disc)) or in a semiconductor memory 54, read out by the drive 50 and installed into the hard disk drive built in the storage section 48. The program installed in the storage section 48 is loaded from the storage section 48 into the RAM 43 and executed in accordance with an instruction of the CPU 41 corresponding to a command from the user inputted to the operation inputting section 46.

Figure 8:
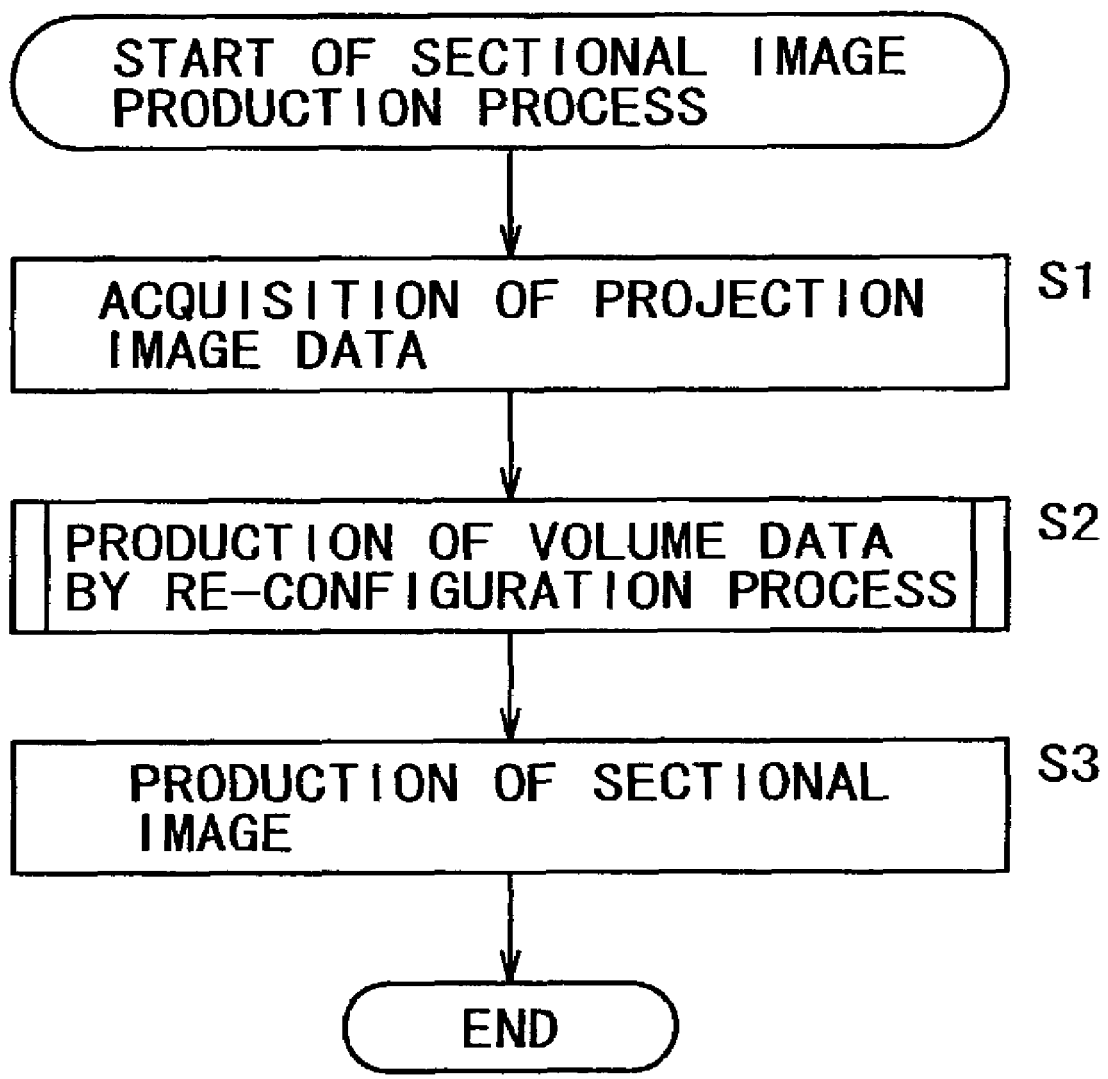
FIG. 8 is a flow chart illustrating action of the image processing apparatus shown in FIG. 6.

Subsequently, action of the image processing apparatus 31 is described with reference to a flow chart of FIG. 8. At step S1, the image processing program acquires projection image data of the specimen 1 from circular omnidirections from the frame memory 25 of the X-ray projection apparatus 21. A plurality of such projection image data thus acquired are stored into the storage section 48. At step S2, the image processing program executes a re-construction process based on the plurality of projection image data acquired by the process at step S1 to produce volume data.

Figure 9:
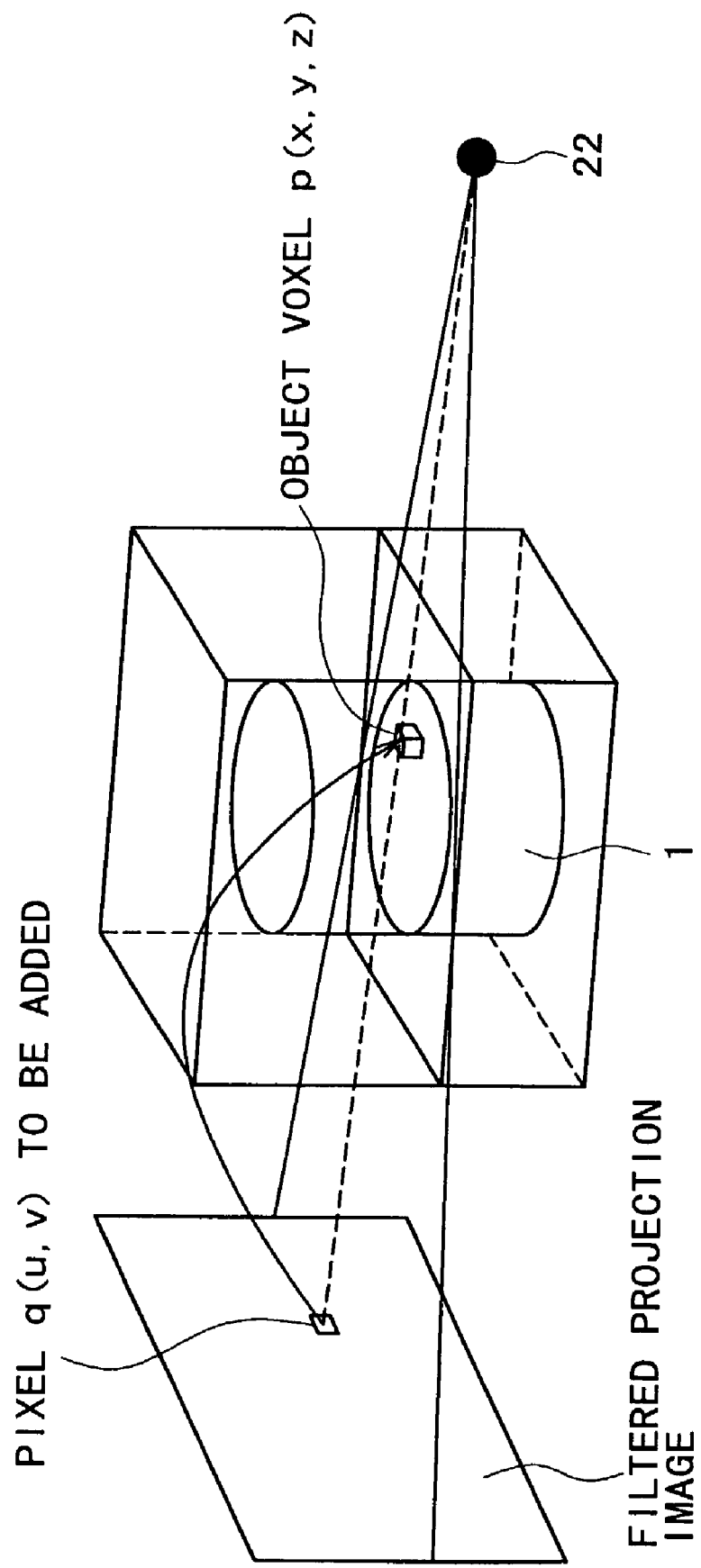
FIG. 9 is a schematic and diagrammatic view illustrating an FBP method.

The Filtered Back Projection method (hereinafter referred to as FBP method) is used for the re-construction process. By the process, the volume data are produced such that one of axes of a coordinate system of volume data (the coordinate system is hereinafter referred to as volume coordinate system) extends in parallel to the principal axis of inertia of the specimen 1 and the origin Ov coincides with the center of the specimen 1. The FBP method is described below with reference to FIG. 9. In the FBP method, projection image data for which a predetermined filtering process has been performed are used.

A voxel p(x, y, z) which composes the volume data is calculated by determining a straight light passing the X-ray source 22 and a point of coordinates (x, y, z) of the coordinate system of the volume data and adding all of pixels q(u, v) at intersecting points between the straight line and individual projection image data for which the filtering process has been performed. For example, where projection image data for 360 images are used, the voxel p(x, y, z) is calculated by adding pixels of the 360 filtered projection image data.

Accordingly, what is most significant in the re-construction process is to specify the coordinates (u, v) of the pixel of each projection image data corresponding to the coordinates (x, y, z) of the voxel. The coordinates (u, v) of a pixel are given by the following expression:

$$(u, v) = (U/W, V/W) \qquad (1)$$

where $$(U, V, W, 1) = (X, Y, Z, 1) \cdot M \qquad (2)$$

where M is a 4×4 matrix and is given by $$M = T \times D \times R \times B \qquad (3)$$

$$(U, V, W, 1) = (X, Y, Z, 1) \times B \qquad (4)$$

$$(X, Y, Z, 1) = (x', y', z', 1) \times R \qquad (5)$$

$$(x', y', z', 1) = (x, y, z, 1) \times T \times D \qquad (6)$$

Figure 10:
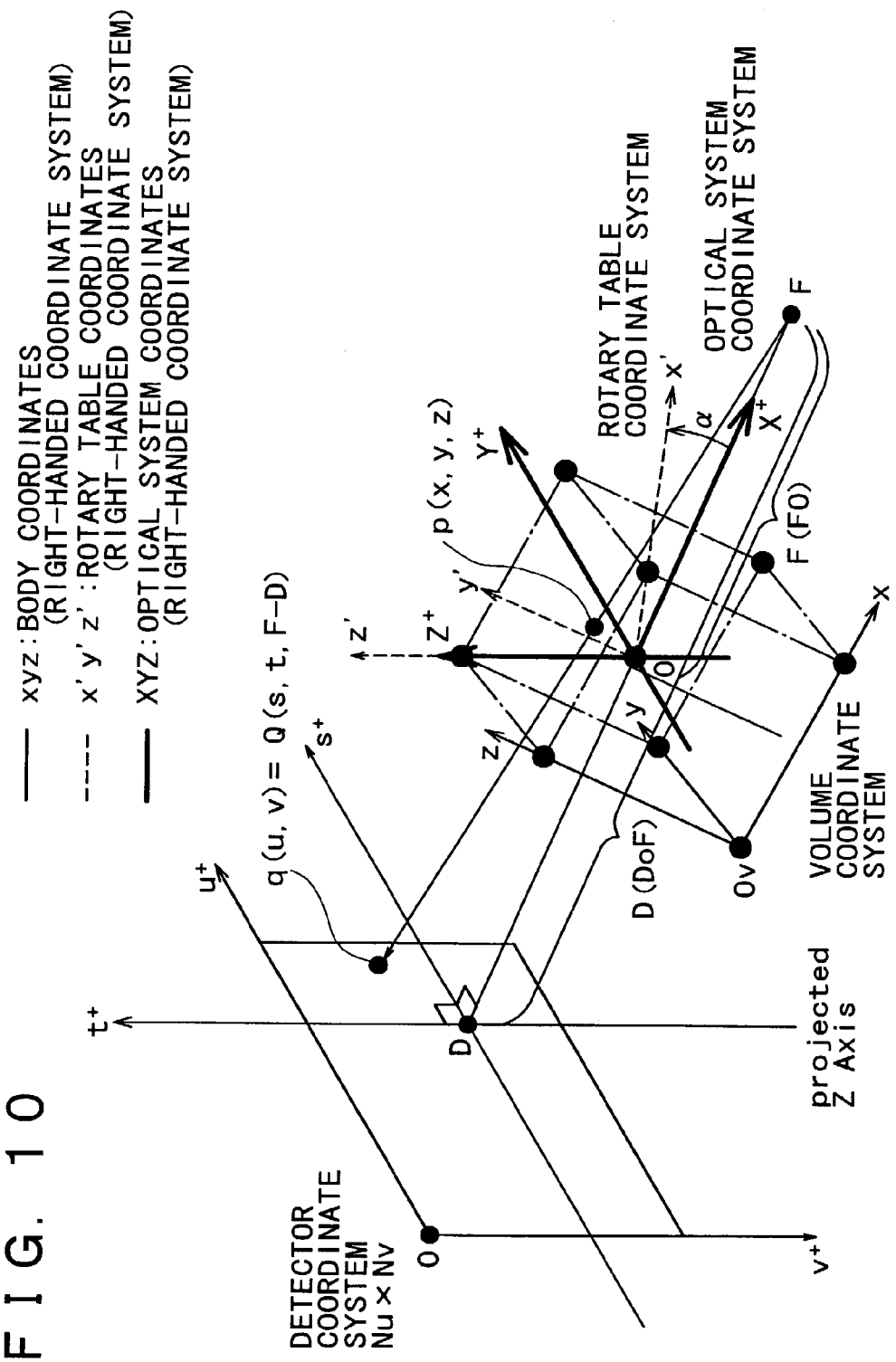
FIG. 10 is a diagrammatic view illustrating a coordinate system.

It is to be noted that the reference characters included in the expressions (3) to (6) above are indicated in FIG. 10. In particular, x, y, z are coordinates of the volume coordinate system. x', y', z' are coordinates of a coordinate system of the rotary table 23 (the coordinate system is hereinafter referred to as rotary table coordinate system). X, Y, Z are coordinates of a coordinate system defined by the X-ray source 22 and the axis of rotation of the rotary table 23 (the coordinate system is hereinafter referred to as optical system coordinate system). u, v are coordinates of the coordinate system of the projection image data (the coordinate system is hereinafter referred to as detector coordinate system).

A 4×4 central point movement transform matrix T given below moves the origin Ov of the volume coordinate system to the center of the specimen 1:

$$T = \begin{pmatrix} dx & 0 & 0 & 0 \\ 0 & dy & 0 & 0 \\ 0 & 0 & dz & 0 \\ Sx - dx*Nx/2 & Sy - dy*Ny/2 & Sz - dz*Nz/2 & 1 \end{pmatrix} \quad (7)$$

A 2×4 center axis alignment transform matrix D rotates the volume coordinate system of the central point movement transform around the origin Ov:

$$D = \begin{pmatrix} e_x & 0 \\ e_y & 0 \\ e_z & 0 \\ 0 & 1 \end{pmatrix} = \begin{pmatrix} a_x/|a_x| & 0 \\ (a_x \times a_y \times a_x)/|a_x \times a_y \times a_x| & 0 \\ (a_x \times a_y)/|a_x \times a_y| & 0 \\ 0 & 1 \end{pmatrix} \quad (8)$$

A 4×4 Z axis rotational central point movement transform matrix R performs, because the rotational angles of the rotary table 23 when different projection image data are produced are different, rotational transform around the Z axis in order to adjust the rotational angles:

$$R = \begin{pmatrix} \cos(\alpha) & \sin(\alpha) & 0 & 0 \\ -\sin(\alpha) & \cos(\alpha) & 0 & 0 \\ 0 & 0 & 1 & 0 \\ 0 & 0 & 0 & 1 \end{pmatrix} \quad (9)$$

A 4×4 reverse projection transform matrix B is transform for determining coordinates of a pixel of projection image data:

$$B = \begin{pmatrix} -(Nu/2) & -(Nv/2) & -1 & 0 \\ D/du & 0 & 0 & 0 \\ 0 & -D/dv & 0 & 0 \\ F(Nu/2) & F(Nv/2) & F & 1 \end{pmatrix} \quad (10)$$

It is to be noted that the reference characters in the matrixes T, D, R and B are such as follows.

x, y, z: coordinate parameters of the volume coordinate system (right-handed coordinate system; representative of the center position of a voxel), X, Y, Z: coordinate parameters of the optical coordinate system (right-handed coordinate system), x', y', z': coordinate parameters of the rotary table coordinate system (right-handed coordinate system), Nx, Ny, Nz: resolutions of volume data in the directions of the axes (the unit is a voxel), dx, dy, dz: lengths per one voxel (the unit is millimeter), ax, ay: three-dimensional direction vectors of the x and y axes as viewed from the rotary table coordinate system (ax≠0, ay≠0)

ex, ey, ez: three-dimensional unit direction vectors of the x, y and z axes as viewed from the rotary table coordinate system (|ex|=|ey|=|ez|=1, perpendicular to each other), Sx, Sy, Sz: amounts of movement of the origin Ov of the volume coordinate system (the unit is millimeter), u, v: coordinate parameters of the detector coordinate system (representative of the center position of a pixel), Nu, Nv: resolutions of the projection image in the directions of the axes (the unit is a pixel), du, dv: lengths of the projection image per one pixel (the unit is millimeter), α: rotational angle of the rotary table 23. The right-hand thread direction as viewed in the + direction of the Z axis is +.

Figure 11:
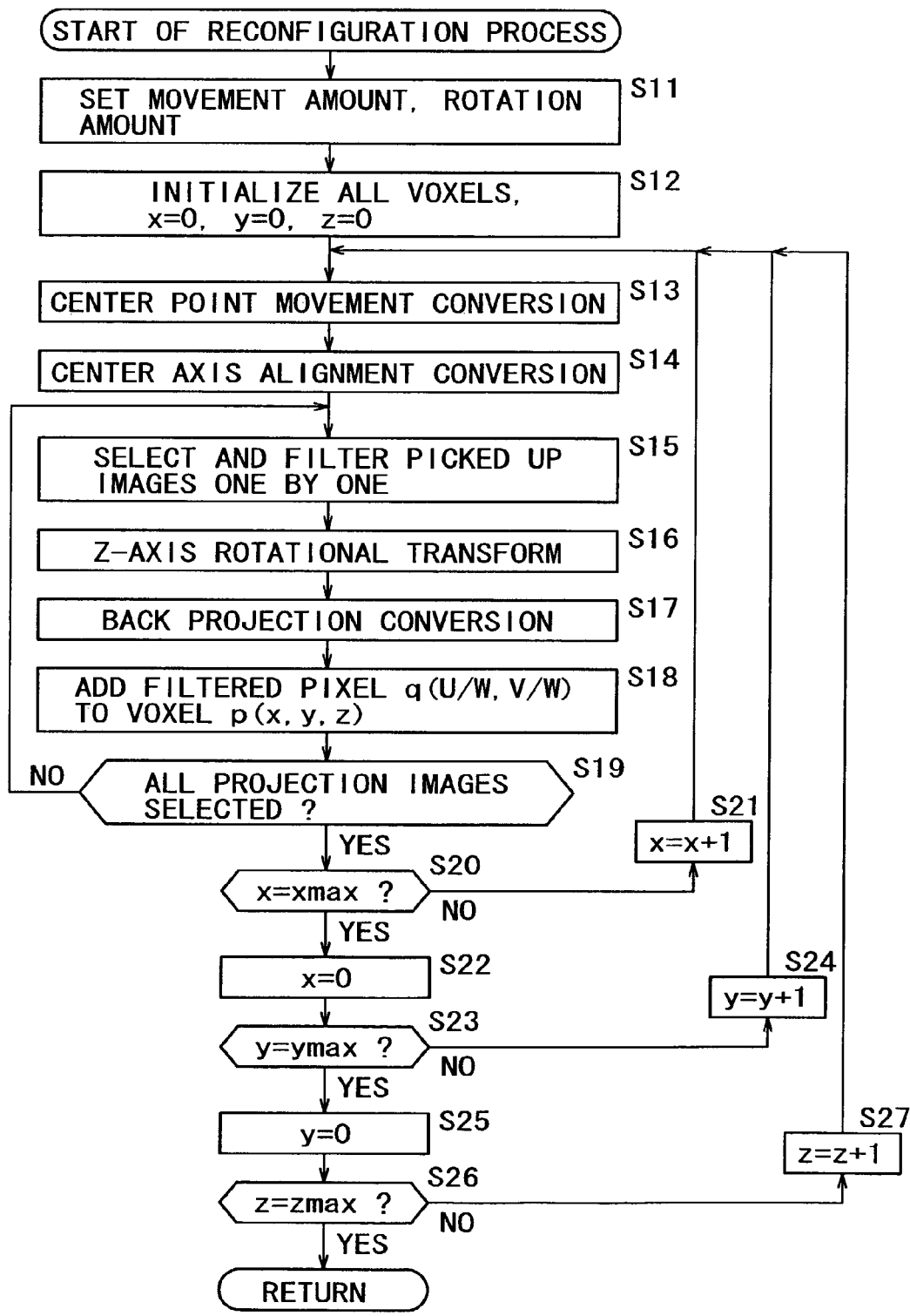
FIG. 11 is a flow chart illustrating details of a re-construction step at step S2 of FIG. 8.

D: distance of a perpendicular from the X-ray source 22 to the two-dimensional light reception section 24, F: distance between the X-ray source 22 and the axis of rotation of the rotary table 23, The re-configuration process at step S2 is described in detail with reference to a flow chart of FIG. 11. At step S11, the image processing program sets movement amounts (Sx, Sy, Sz) of the origin Ov from its initial values in response to an adjusting operation of the user who intends to cause the origin Ov of the volume coordinate system of volume data to be produced to coincide with the center of the specimen 1. Further, the image processing program sets rotational angles (ax, ay) of the xyz volume coordinate system from its initial values in response to an adjusting operation of the user who intends to cause one of the axes of the volume coordinate system of the volume data to be produced finally to extend in parallel to the principal axis of inertia of the specimen 1.

It is to be noted that, since it is difficult for the user to appropriately adjust the movement amounts (Sx, Sy, Sz) and the rotational angles (ax, ay) in accordance with its intention, it is advisable, for example, to prepare interfaces which can continuously adjust the movement amounts and the rotational angles, perform several trials and store set values when desired sectional image data are obtained, and thereafter use the stored set values.

At step S12, the image processing program initializes all voxels p(x, y, z) of the volume data to be produced after this. Further, the image processing program initializes the coordinate parameters x, y, z of the volume coordinate system to 0.

At step S13, the image processing program multiplies (x, y, z, 1) including the coordinate parameters of the volume coordinate system by the central point movement transform matrix T to which the movement amounts (Sx, Sy, Sz) are applied. Then at step S14, the image processing program multiplies a result of the multiplication at step S13 by the center axis alignment transform matrix D to which the rotational angles (ax, ay) are applied to calculate (x', y', z', 1) including the coordinate parameters of the rotary table coordinate system.

At step S15, the image processing program selects one of the projection image data acquired at step S1 to acquire the rotational angle α of the rotary table 23 added to the selected projection image data. Further, the image processing program performs a predetermined filtering process for the selected projection image data. It is to be noted that the predetermined filtering process may otherwise be performed for all of the projection image data acquired by the process at step S1.

At step S16, the image processing program multiplies (x', y', z', 1) including the coordinate parameters of the rotary table coordinate system by the Z axis rotational central point movement transform matrix R to which the rotational angle α is applied to calculate (X, Y, Z, 1) including the coordinate parameters of the optical coordinate system. At step S17, the image processing program multiplies (X, Y, Z, 1) including the coordinate parameters of the optical coordinate system by the reverse projection transform matrix B to calculate (U, V, W, 1) including the coordinate parameters of the detector coordinate system.

At step S18, the image processing program adds the pixel q(U/W, V/W) of the selected filtered projection image data to the voxel p(x, y, z). At step S19, the image processing program discriminates whether or not all projection data have been selected by the process at step S15. If it is discriminated that all projection image data have not been selected, then the processing returns to step S15 so that the processes at the steps beginning with step S15 are repeated. Through the repetitions, the pixels of all of the projection image data are added to each other. Thereafter, if it is discriminated at step S19 that all projection image data have been selected, then the processing advances to step S20.

At step S20, the image processing program discriminates whether or not the coordinate parameter x of the volume coordinate system is equal to a maximum value xmax. If it is discriminated that the parameter x is not equal to the maximum value xmax, then the processing advances to step S21. At step S21, the image processing program increments the coordinate parameter x by 1. Thereafter, the processing returns to step S13 so that the processes at the steps beginning with step S13 are repeated. Then, if it is finally discriminated at step S20 that the coordinate parameter x is equal to the maximum value xmax, the processing advances to step S22.

At step S22, the image processing program initializes the coordinate parameter x to 0. Then at step S23, the image processing program discriminates whether or not the coordinate parameter y is equal to a maximum value ymax. If the coordinate parameter y is not equal to the maximum value ymax, then the processing advances to step S24. At step S24, the image processing program increments the coordinate parameter y by 1. Thereafter, the processing returns to step S13 so that the processes at the steps beginning with step S13 are repeated. Then, if it is finally discriminated that the coordinate parameter y is equal to the maximum value ymax, then the processing advances to step S25.

At step S25, the image processing program initializes the coordinate parameter y to 0. At step S26, the image processing program discriminates whether or not the coordinate parameter z of the volume coordinate system is equal to a maximum value zmax. If it is discriminated that the coordinate parameter z is not equal to the maximum value zmax, then the processing advances to step S27. At step S27, the image processing program increments the coordinate parameter z by 1. Thereafter, the processing returns to step S13 so that the processes at the steps beginning with step S13 are repeated. Then, if it is finally discriminated at step S26 that the coordinate parameter z is equal to the maximum value zmax, then the re-construction process comes to an end and the processing returns to step S3 of FIG. 8.

Figure 12:
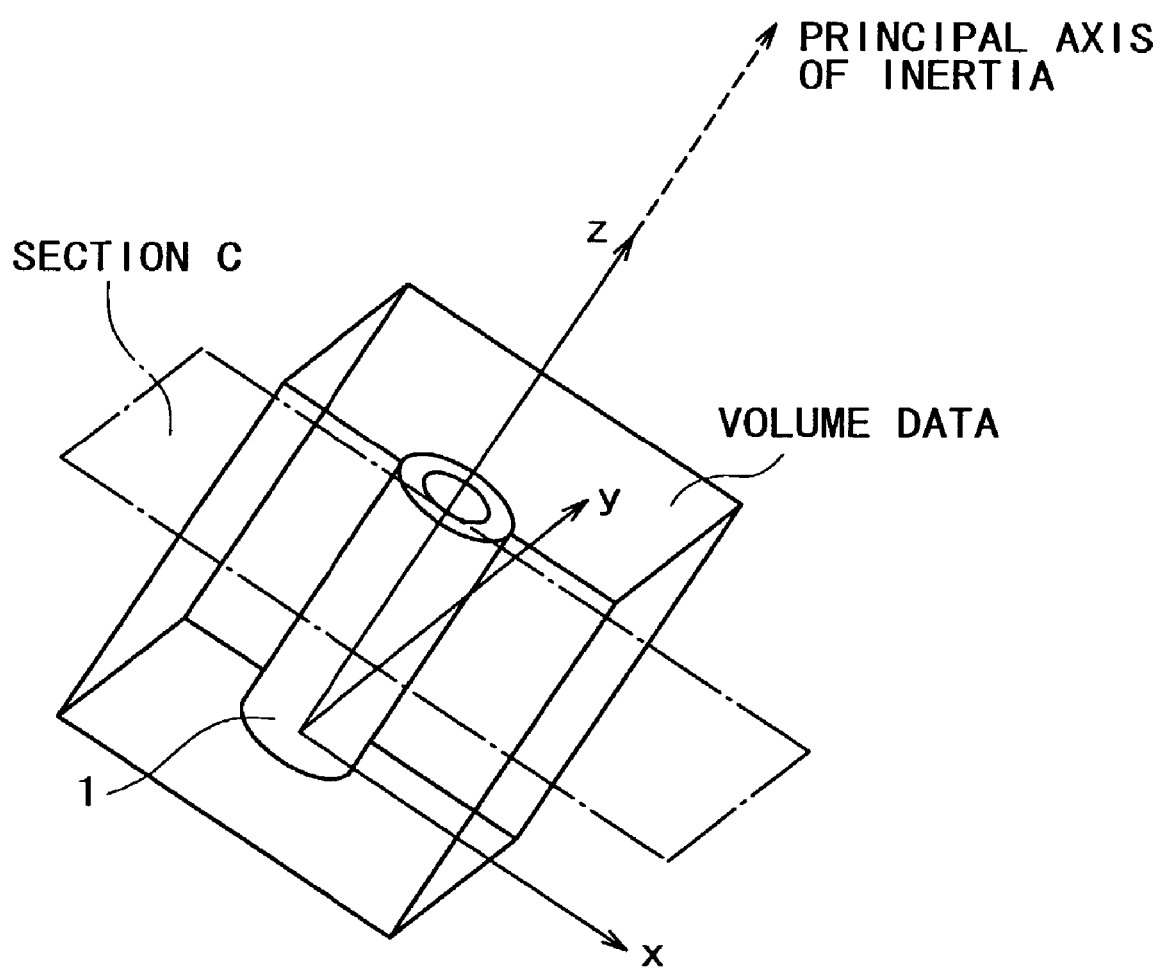
FIG. 12 is a schematic and diagrammatic view illustrating a process at step S3 of FIG. 8.

With the re-construction process described above, since the movement amounts (Sx, Sy, Sz) and the rotational angles (ax, ay) are set appropriately by the process at step S11, volume data can be produced such that, for example, as shown in FIG. 12, one of the coordinate axes of the volume coordinate system (in FIG. 12, the z axis) may be aligned with the principal axis of inertia of the specimen 1.

Referring back to FIG. 8, the image processing program produces sectional image data of, for example, a section C of FIG. 12 at step S3. In this instance, from among all voxels which compose the volume data, only those voxels having a predetermined value as the z coordinate may be read out. This process can be executed very readily. As seen in FIG. 13, the section C perpendicular to the coordinate axis z is occupied by existing voxels. Accordingly, the sectional image data of the section C do not require interpolation of pixels because the existing voxels may be regarded as pixels, and therefore, the picture quality does not suffer from any deterioration. The description of the action of the image processing apparatus 31 is completed therewith.

As described above, with the image processing apparatus 31, since the origin and the inclination of the volume coordinate system can be set arbitrarily by the re-construction process, sectional image data of the specimen 1 in an arbitrary direction can be produced without suffering from any deterioration of the picture quality which arises from interpolation of pixels. It is to be noted, while, in the embodiment described above, an orthogonal three-dimensional coordinate system of the right-handed coordinate system is applied, any other coordinate system may be applied alternatively.

Further, while, in the embodiment described above, the X-ray source 22 and the three-dimensional light reception section 24 are fixed while the specimen 1 is rotated by 360 degrees, the present invention can be applied also to an alternative system wherein the X-ray source 22 and the three-dimensional light reception section 24 revolve around the specimen 1. Incidentally, the series of processes by the image processing program described may otherwise be executed by hardware.

It is to be noted that, in the present specification, the steps which describe the program recorded in a recording medium may be but need not necessarily be processed in a time series in the order as described, and include processes which are executed in parallel or individually without being processed in a time series. Further, in the present specification, the term system represents an entire apparatus composed of a plurality of apparatus.

Where the first embodiment described above is applied, it is possible to acquire volume data of a three-dimensional body of a specimen while sectional image data of the specimen in an arbitrary direction are produced without much deterioration of the picture quality. Meanwhile, according to a second embodiment of the present invention described below, a rendering process when a three-dimensional body can be performed efficiently based on volume data acquired by the first embodiment or some other method. It is to be noted that, while the second embodiment can be applied also to volume data acquired using the three-dimensional X-ray CT (Computerized Tomography) technique or the MRI (Magnetic Resonance Imaging) technique, it can be applied also to volume data acquired by any other technique.

Figure 16:
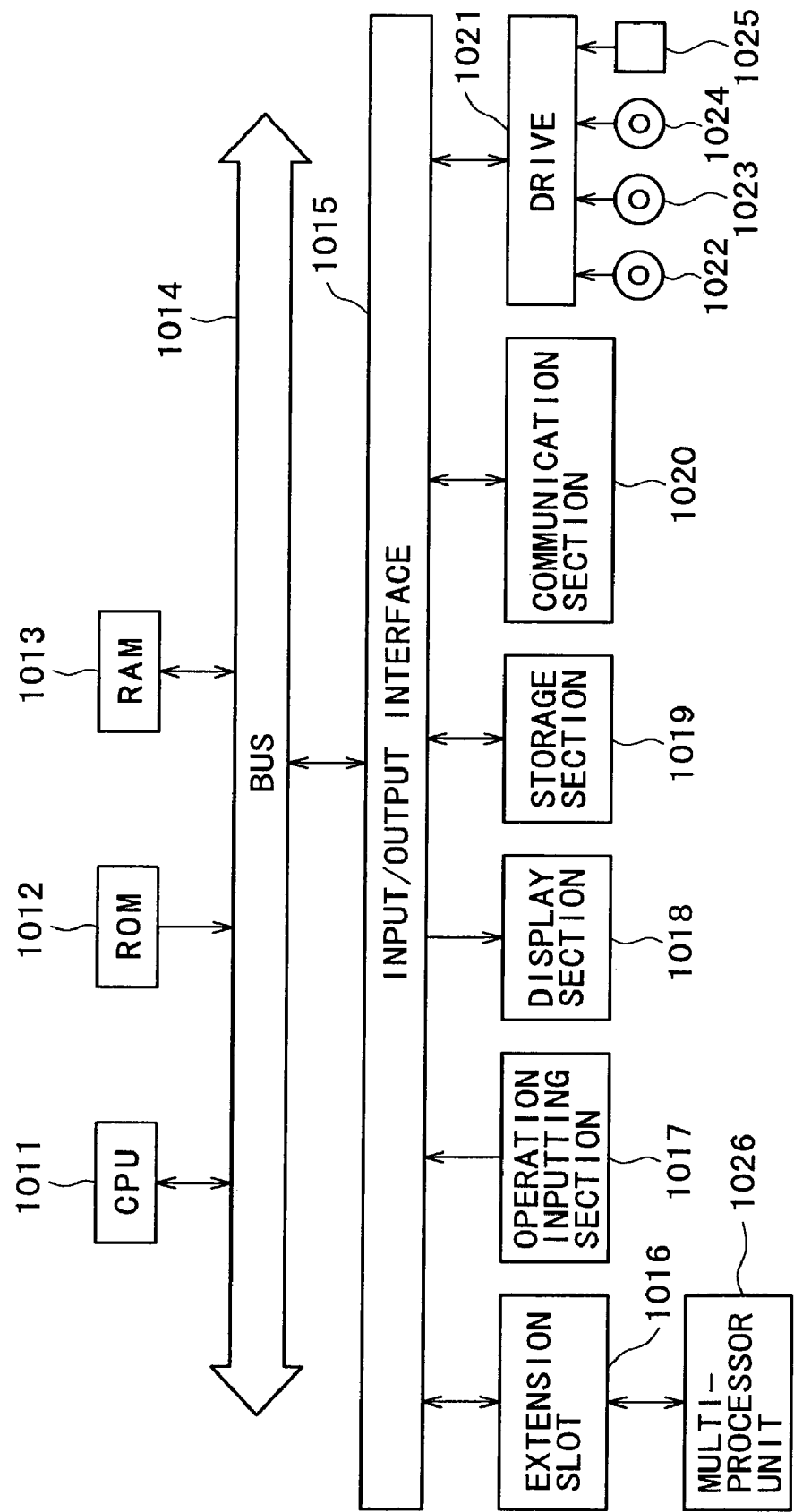
FIG. 16 is a block diagram showing an example of a configuration of a personal computer.

Now, a second embodiment of the present invention is described with reference to the accompanying drawings. Referring to FIG. 16, there is shown an example of a configuration of a personal computer which acts as an image processing apparatus of the present invention by executing a volume rendering program 1051 illustrated in FIG. 19. The personal computer includes a CPU (Central Processing Unit) 1011 built therein. An input/output interface 1015 is connected to the CPU 1011 by a bus 1014. A ROM (Read Only Memory) 1012 and a RAM (Random Access Memory) 1013 are connected to the bus 1014.

Connected to the input/output interface 1015 are an extended slot 1016 into which an extension card such as a multi-processor unit 1026 is loaded, an operation inputting section 1017 including input devices such as a keyboard and a mouse for being operated by the user to input an operation command, a display section 1018 in the form of a CRT (Cathode Ray Tube), an LCD (Liquid Crystal Display) unit or the like for displaying a three-dimensional image of a result of a volume rendering process, a storage section 1019 in the form of a hard disk drive or the like for storing a program, volume data and other necessary data, a communication section 1020 for communicating data with another computer through the Internet or some other network, and a drive 1021 for writing and reading out data into and from a recording medium such as a magnetic disk 1022, an optical disk 1023, a magneto-optical disk 1024 or a semiconductor memory 1025.

The volume rendering program 51 for causing the personal computer to execute action as an image processing apparatus has been supplied to the personal computer in a state stored on a magnetic disk 1022 (including a flexible disk), an optical disk 1023 (including a CD-ROM (Compact Disc-Read Only Memory) and a DVD (Digital Versatile Disc)), a magneto-optical disk 1024 (including an MD (Mini Disc)) or in a semiconductor memory 1025, read out by the drive 1021 and installed into the hard disk drive built in the storage section 1019. The volume rendering program 1051 installed in the storage section 1019 is loaded from the storage section 1019 into the RAM 1013 and executed in accordance with an instruction of the CPU 1011 corresponding to a command from the user inputted to the operation inputting section 1017.

Figure 17:
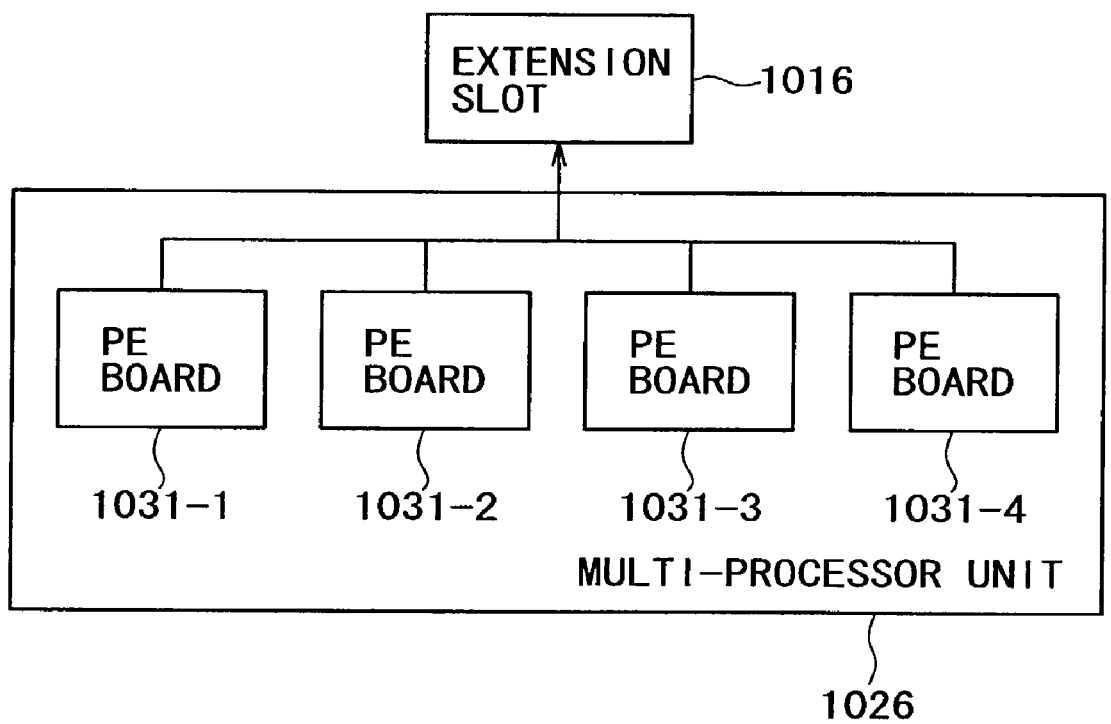
FIG. 17 is a block diagram showing an example of a configuration of a multi-processor unit shown in FIG. 16.

FIG. 17 shows an example of a configuration of the multi-processor unit 1026. The multi-processor unit 1026 includes four processor element (PE) boards 1031 particularly denoted by reference characters 1031-1 to 1031-4. It is to be noted that the number of processor element boards 1031 may otherwise be any number other than 4.

Figure 1:
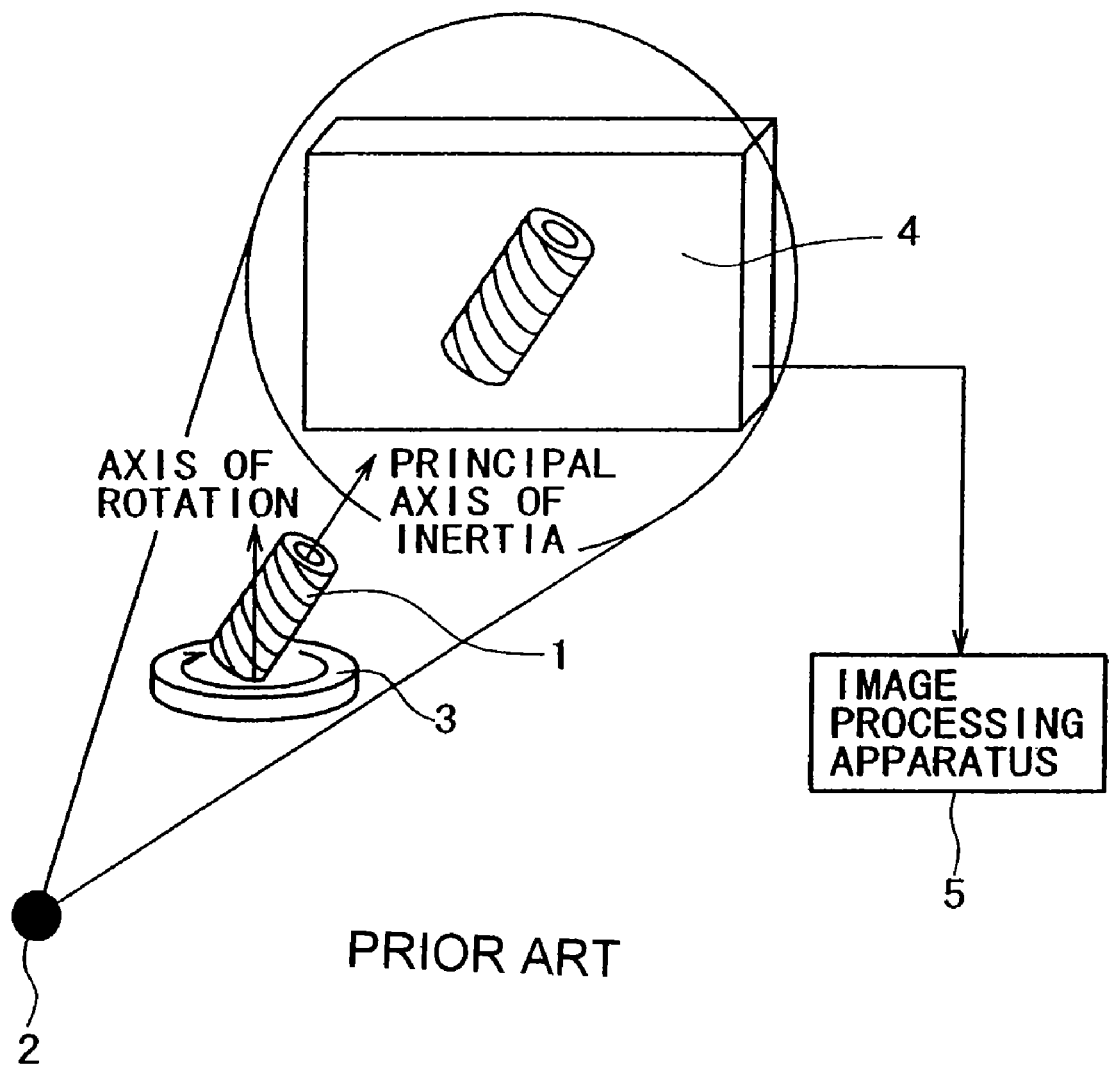
FIG. 1 is a schematic and diagrammatic view showing an example of a configuration of a conventional three-dimensional X-ray CT system.
Figure 2:
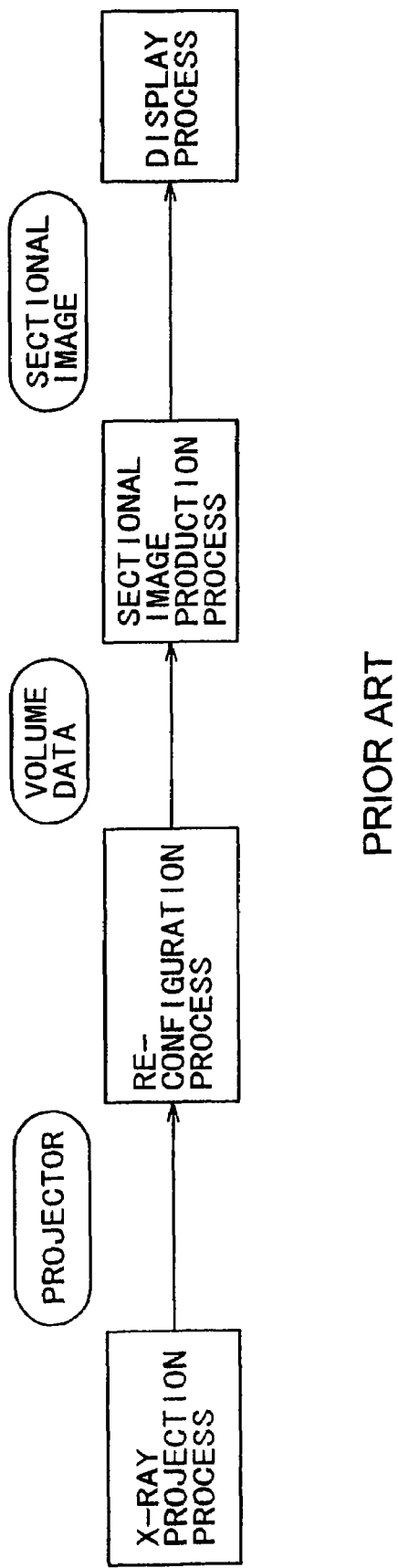
FIG. 2 is a flow diagram illustrating action of the conventional three-dimensional X-ray CT system of FIG. 1.
Figure 3:
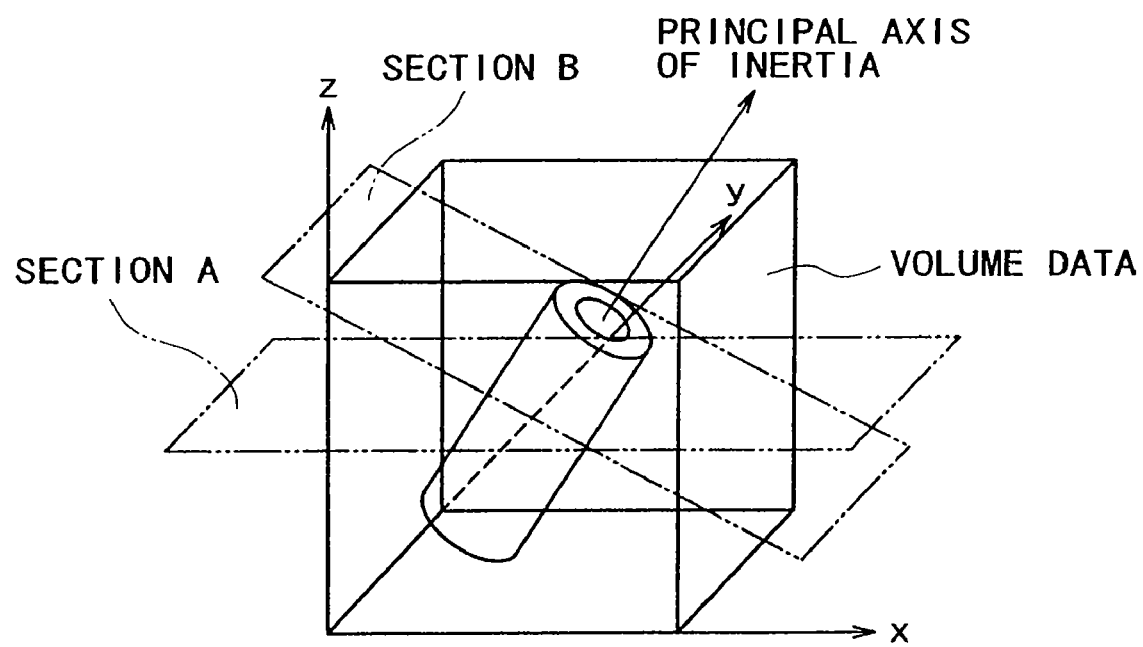
FIG. 3 is a schematic and diagrammatic view illustrating a sectional image data production process of FIG. 2.
Figure 4:
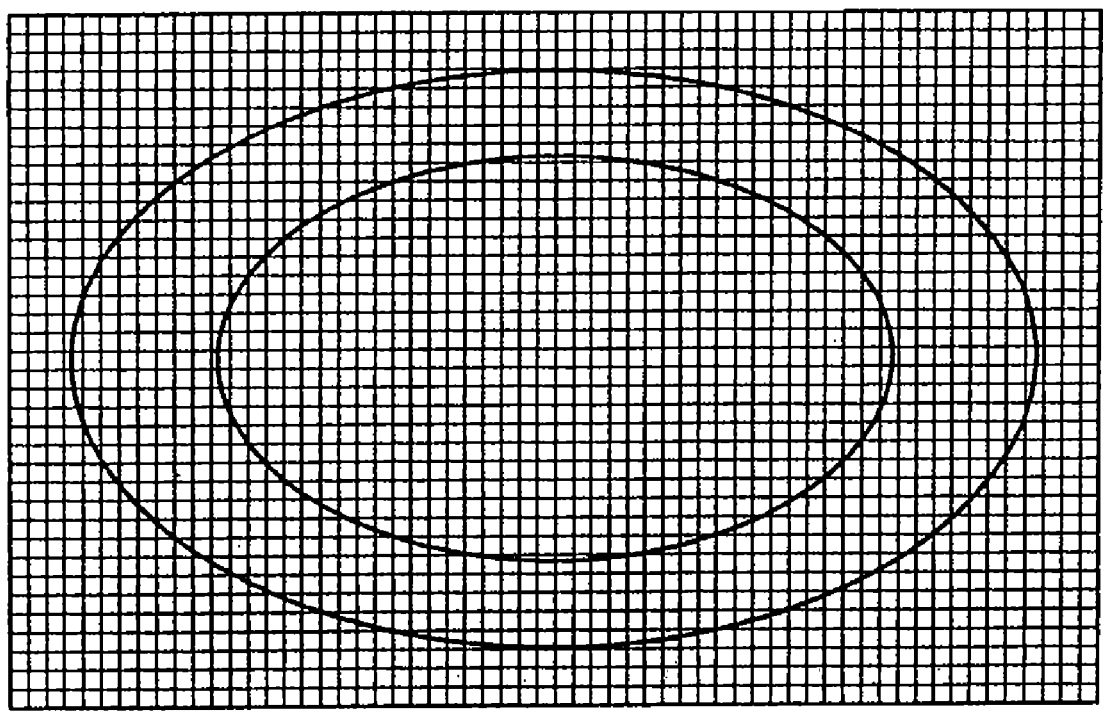
FIGS. 4 and 5 are diagrammatic views illustrating image data production processes of FIG. 2.
Figure 5:
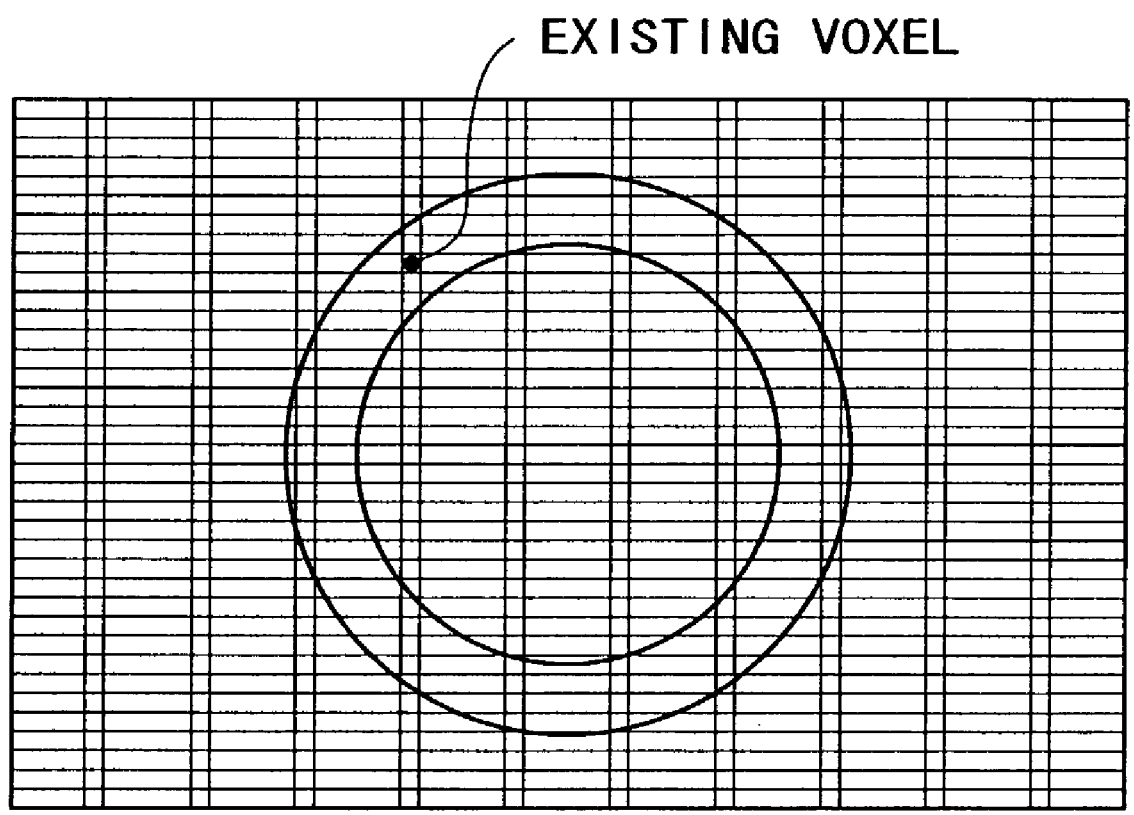

Referring to FIG. 18, the processor element board 1031-1 has such a tree structure that child processor elements 1042 particularly denoted by 1042-1 to 1042-5 are connected in a lower hierarchy of a parent processor element 1041 as shown in FIG. 5. Where such a tree structure as just described is used, a process of supplying the same arithmetic operation program, volume data and so forth to the child processor elements 1042-1 to 1042-5 from the parent processor element 1041 can be completed by single time communication.

The parent processor element 1041 and the processor elements 1042-1 to 1042-5 have local memories 1043 particularly denoted by 1043-1 to 1043-6 built therein. The local memories 1043-1 to 1043-6 have an equal capacity. It is to be noted that the number of such child processor elements 1042 may otherwise be any number other than 5.

The parent processor element 1041 is ready for a rendering mode supplied from a communication library 1055 (FIG. 19) through the extended slot 1016, and stores an arithmetic operation program, parameters and so forth supplied thereto into the local memory 1043-1 built therein and supplies them to the child processor elements 1042-1 to 1042-5 in the lower hierarchy. Further, the parent processor element 1041 supplies volume data supplied thereto from the communication library 1055 through the extended slot 1016 to the child processor elements 1042-1 to 1042-5 in the lower hierarchy. Furthermore, the parent processor element 1041 couples image data of results of arithmetic operation of the parent processor element 1041 itself and the child processor elements 1042-1 to 1042-5 and outputs resulting image data through the extended slot 1016.

Each of the parent processor element 1041 and the child processor elements 1042-1 to 1042-5 accesses only volume data recorded in the local memory 1043 built therein and produces image data by predetermined arithmetic operation. Also, the processor element boards 1031-2 to 1031-4 have a similar configuration to that of the processor element board 1031-1 described above, and therefore, overlapping description thereof is omitted herein to avoid redundancy.

Figure 19:
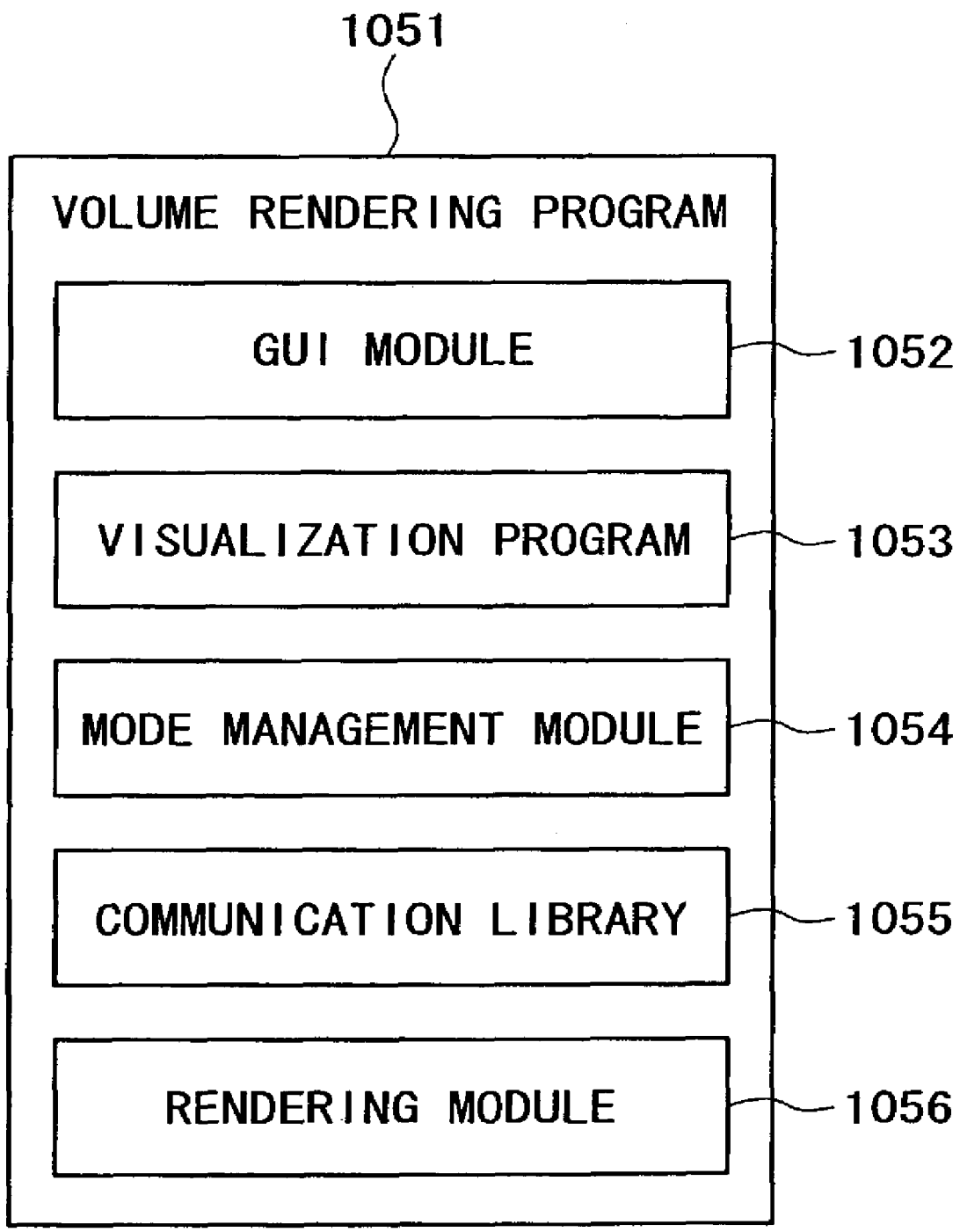
FIG. 19 is a block diagram showing an example of function modules of a volume rendering program executed by the personal computer of FIG. 16.

FIG. 19 illustrates an example of a configuration of function modules of the volume rendering program 1051 executed by the CPU 1011. Referring to FIG. 19, a GUI module 1052 accepts an operation from the user inputted to the operation inputting section 1017 for designating a transform function for determining the opacity or the color for a scalar value of volume data or a parameter representative of the position of an eye point, the posture of the specimen or the like. A visualization module 1053 converts an input from the user accepted by the GUI module 1052 into a parameter.

A mode management module 1054 selects an optimum one of rendering modes A, B and C based on a parameter or the like outputted from the visualization module 1053. A communication library 1055 supplies the arithmetic operation program, a parameter outputted from the visualization module 1053 and a rendering mode selected by the mode management module 1054 to the multi-processor unit 1026. Further, the management module 1054 divides volume data in accordance with a rendering mode selected by the mode management module 1054 itself and outputs the divisional volume data to the multi-processor unit 1026. A rendering module 1056 produces rendering image data including the entire specimen based on image data outputted from the processor element boards 1031-1 to 1031-4 of the multi-processor unit 1026.

Figure 20:
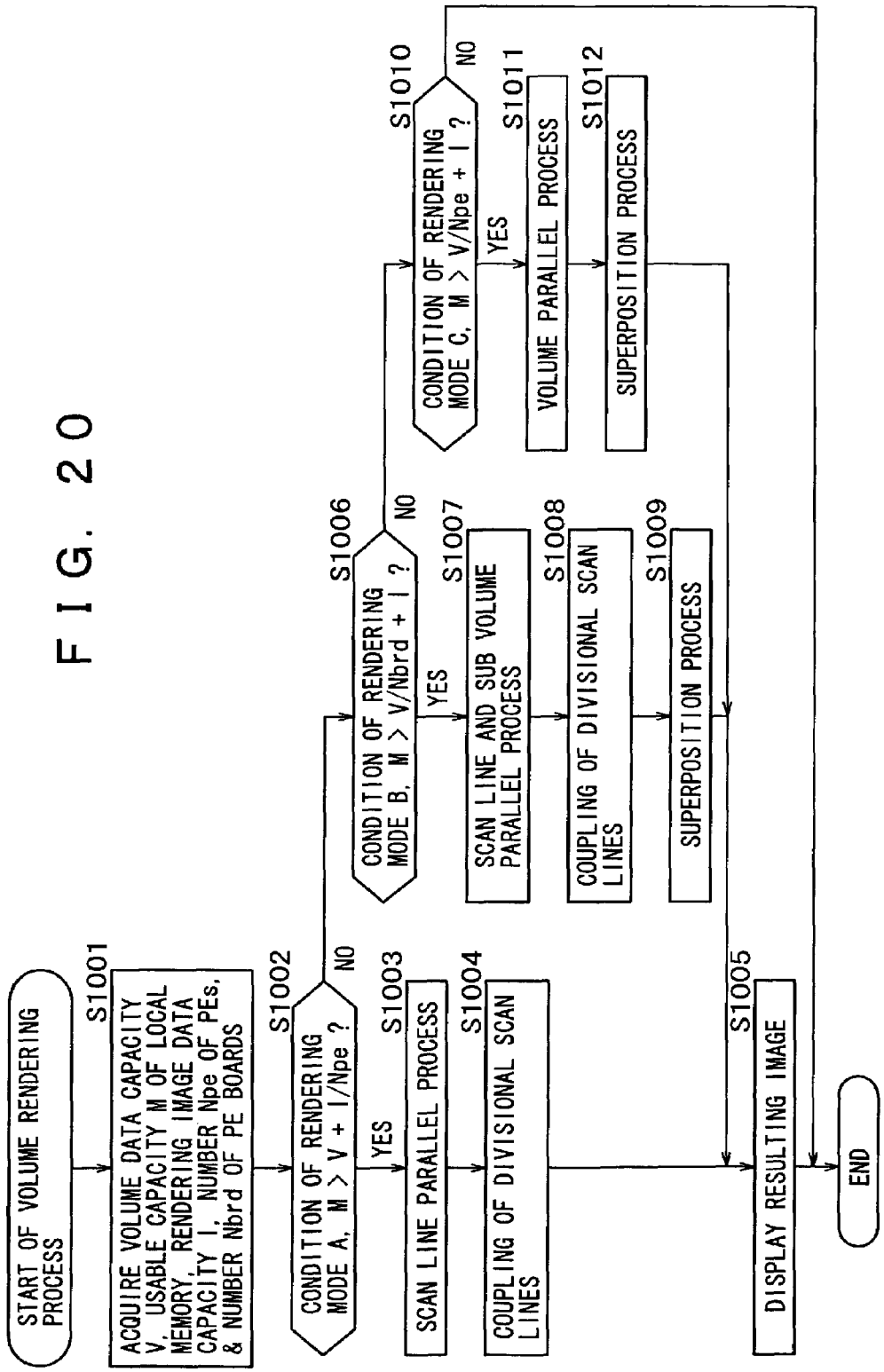
FIG. 20 is a flow chart illustrating a volume rendering process executed by the personal computer of FIG. 16.

Subsequently, a volume rendering process by the volume rendering program 1051 is described with reference to a flow chart of FIG. 20. It is to be noted that volume data have been acquired already and an operation from the user for designating the position of the eye point and so forth has been performed and besides the arithmetic operation program has been supplied to the parent processor element 1041 and the child processor elements 1042.

At step S1001, the mode management module 1054 acquires the capacity V of the volume data, the usable capacity M of each local memory 1043, the capacity I of rendering image data to be displayed as a result of processing, the number Npe of the processor elements (parent processor element 1041 and child processor elements 1042) incorporated in the multi-processor unit 1026, and the number of the processor element boards 1031.

Here, it is assumed that the local memories 1043 have a common usable capacity M. The capacity I of rendering image data to be produced finally is determined based on the size (horizontally x pixels×vertically y lines) of a rendering image displayed finally and the number z of bits of the information amount per one pixel. The number Npe of the processor elements incorporated in the multi-processor unit 1026 is 24 (=6×4) in the present arrangement. The number of processor element boards 1031 in the present arrangement is 4.

It is to be noted that the usable capacity M of each local memory 1043, the number Npe of the processor elements and the number of the processor element boards 31 may be set in advance because they are not particularly varying values.

At step S1002, the mode management module 1054 discriminates whether or not the values acquired at step S1001 satisfy the condition for the rendering mode A given by the following expression (11):

$$M > V + I/Npe \tag{11}$$

If it is discriminated that the expression (11) of the condition for the rendering mode A is satisfied, then the processing advances to step S1003. In this instance, it is considered that the capacity V of the volume data of the specimen is smaller than that where the rendering mode B or C is applied as hereinafter described as seen in FIG. 21.

It is to be noted, however, that, although the size of volume data of a specimen varies depending not only upon the size of a rendering image of the specimen but also upon the information amount of scalar values per sample point, in FIG. 21, the size of a rendering image of a specimen to be plotted is varied in order to facilitate visual recognition of the relationship in magnitude of volume data to which the rendering modes A, B and C are applied.

At step S1003, the communication library 1055 issues a notification of the rendering mode A to the multi-processor unit 1026. Further, the communication library 1055 supplies volume data of such an entire specimen as shown in FIG. 9A to the multi-processor unit 1026. The parent processor element 1041 of each of the processor element boards 1031 of the multi-processor unit 1026 stores the volume data (hereinafter referred to as all volume data) supplied thereto into the local memory 1043 thereof and supplies the all volume data to the child processor elements 1042-1 to 1042-5 in the lower hierarchy. Consequently, each of the totaling 24 processor elements incorporated in the multi-processor unit 1026 individually stores the all volume data and can produce image data at an arbitrary portion of the specimen.

Figure 22A:
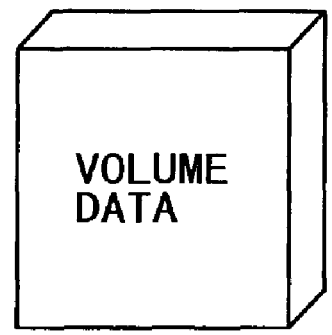
FIGS. 22A, 22B and 22C are diagrammatic views illustrating a process in the rendering mode A.
Figure 22B:
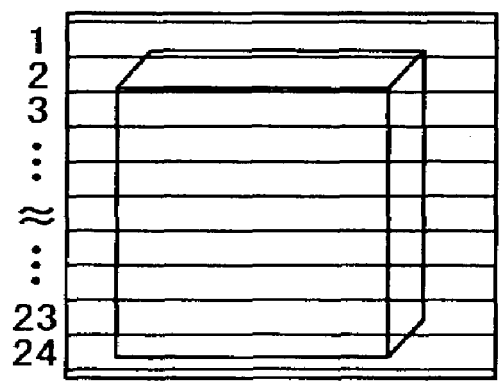
Figure 22C:
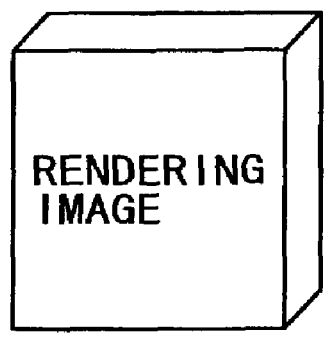

The totaling 24 processor elements incorporated in the multi-processor unit 1026 individually produce image data for y/24 lines from within a rendering image (horizontally x pixels×vertically y lines) to be displayed finally as seen in FIG. 22B. For example, the parent processor element 1041 of the processor element board 1031-1 produces image data of first y/24 lines from above from within a rendering image to be displayed finally; the child processor element 1042-1 produces image data for second y/24 lines from above; the child processor element 1042-2 produces image data for third y/24 lines from above; the child processor element 1042-3 produces image data for fourth y/24 lines from above; the child processor element 1042-4 produces image data for fifth y/24 lines from above; and the child processor element 1042-5 produces image data for sixth y/24 lines from above.

Also, in each of the processor element boards 1031-2 to 1031-4, each of the processor elements produces image data for y/24 lines. Image data for y/24 lines produced by each of the totaling 24 processor elements are stored into the respective local memory 1043.

At step S1004, each parent processor element 1041 couples the image data for the first to sixth y/24 lines from above produced by the parent processor element 1041 itself and the child processor elements 1042-1 to 1042-5 in the lower hierarchy to produce image data for y/4 lines and outputs the image data for y/4 lines to the rendering module 1056.

The rendering module 1056 couples the image data for the four y/4 lines inputted from the processor element boards 1031-1 to 1031-4 to produce such a rendering image to be displayed finally as seen in FIG. 9C. At step S1005, the display section 1018 displays the rendering image. A process where the rendering mode A is applied is executed in such a manner as described above.

If it is discriminated at step S1002 that the expression (1) of the condition for the rendering mode A is not satisfied, then the processing advances to step S1006. At step S1006, it is discriminated whether or not the values acquired at step S1 satisfy the condition for the rendering mode B represented by the following expression (12):

$$M > V/Nbrd + I \qquad (12)$$

If it is discriminated that the expression (2) representative of the condition for the rendering mode B is satisfied, then the processing advances to step S1007. In this instance, it is considered that, as seen in FIGS. 21A to 21C, the capacity V of the volume data of the specimen is greater than that where the rendering mode A described above is applied but is smaller than that where the rendering mode C hereinafter described is applied.

At step S1007, the communication library 1055 issues a notification of the rendering mode B to the multi-processor unit 1026. Further, the communication library 1055 divides the volume data of the specimen with planes perpendicular to one of the X, Y and Z axes (in FIG. 10A, planes perpendicular to the X axis) into a number of portions equal to the number Nbrd (in the present case, four) of the processor element boards 1031. The four divisional volume data of the specimen are hereinafter referred to as sub volume data (1/4), sub volume data (2/4), sub volume (3/4) and sub volume data (4/4). The communication library 1055 supplies the sub volume data (1/4) to the processor element board 1031-1, the sub volume data (2/4) to the processor element board 1031-2, the sub volume data (3/4) to the processor element board 1031-3 and the sub volume data (4/4) to the processor element board 1031-4.

The parent processor element 1041 of the processor element board 1031-1 stores the sub volume data (1/4) supplied thereto into the local memory 1043 of the parent processor element 1041 itself and supplies the sub volume data (1/4) to the child processor elements 1042-1 to 1042-5 in the lower hierarchy. Consequently, the totaling six processor elements incorporated in the processor element board 1031-1 store the same sub volume data (1/4) and can individually produce image data of an arbitrary portion of the leftmost portion (1/4) of the specimen.

Figure 23A:
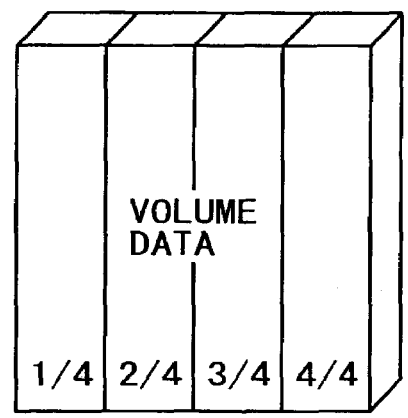
FIGS. 23A, 23B and 23C are diagrammatic views illustrating a process in the rendering mode B.
Figure 23B:
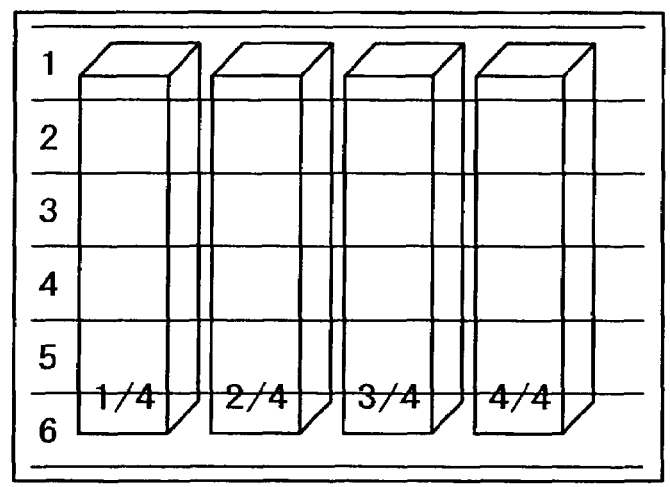

The totaling six processor elements incorporated in the processor element board 1031-1 produce image data for y/6 lines of the leftmost portion (1/4) of the rendering image (horizontally x pixels×vertically y lines) to be displayed finally as seen in FIG. 23B. For example, the parent processor element 1041 of the processor element board 1031-1 produces image data for the uppermost y/6 lines of the leftmost portion (1/4) of the rendering image to be displayed finally; the child processor element 1042-1 produces image data for the second uppermost y/6 lines of the leftmost portion (1/4) of the rendering image; and the child processor element 1042-2 produces image data for the third uppermost y/6 lines of the leftmost portion (1/4) of the rendering image.

The image data for the y/6 lines of the leftmost portion (1/4) of the rendering image to be displayed finally produced by each of the six processor elements of the processor element board 1031-1 are stored into the respective local memory 1043. It is to be noted that similar processes are performed in parallel to each other also by the processor element boards 1031-2 to 1031-4.

At step S1008, the parent processor element 1041 of the processor element board 1031-1 couples the image data for the first to sixth y/6 lines from above of the leftmost portion (1/4) of the rendering image to be displayed finally which have been produced by the parent processor element 1041 itself and the child processor elements 1042-1 to 1042-5 in the lower hierarchy and outputs the produced image data for the left most potion (1/4) of the rendering image to be displayed finally to the rendering module 1056.

Similar processes are performed in parallel also by the processor element boards 1031-2 to 1031-4. In particular, the processor element board 1031-2 outputs image data at a middle portion of the rendering image to be displayed finally to the rendering module 1056. The processor element board 1031-3 outputs image data of another middle portion of the rendering image to be displayed finally to the rendering module 1056. The processor element board 1031-4 outputs image data of the rightmost portion (4/4) of the rendering image to be displayed finally to the rendering module 1056.

Figure 23C:
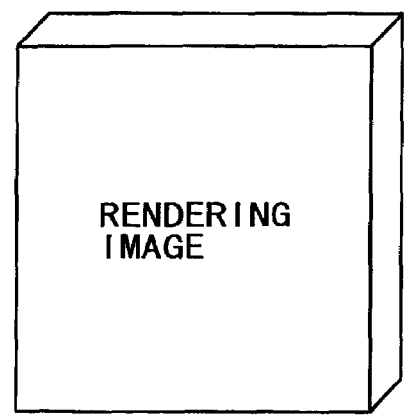

At step S1009, the rendering module 1056 executes a superposition process for the image data of the portions (1/4) to (4/4) of the rendering image to be displayed finally, which have been inputted from the processor element boards 1031-1 to 1031-4, respectively, (in the case of FIG. 23, a process of synthesizing the four divisional side faces of the specimen) to produce the rendering image to be displayed finally as shown in FIG. 10C. Thereafter, the processing advances to step S1005 so that the processes at the steps beginning with step S1005 are thereafter performed. A process where the rendering mode B is applied is executed in such a manner a described above.

If it is discriminated at step S1006 that the expression (2) representative of the condition for the rendering mode B is not satisfied, then the processing advances to step S1010. At step S1010, the mode management module 1054 discriminates whether or not the values acquired at step S1 satisfy the condition for the rendering mode C represented by the following expression (13):

$$M > V/Npe + 1 \quad (13)$$

If it is discriminated that the expression (13) representative of the condition for the rendering mode C is satisfied, then the processing advances to step S1011. In this instance, it is considered that the capacity V of the volume data of the specimen is greater than that where the rendering mode A or B described hereinabove is applied as seen in FIG. 21.

At step S1011, the communication library 1055 issues a notification of the rendering mode C to the multi-processor unit 1026. Further, the communication library 1055 divides the volume data of the specimen with planes perpendicular to one of the X, Y and Z axes (in FIG. 11A, planes perpendicular to the X axis) into a number of portions equal to the number Npe (in the present case, 24) of the processor elements incorporated in the multi-processor unit 1026. The 24 divisional volume data of the specimen are hereinafter referred to as sub volume data (1/24) to (24/24).

The communication library 1055 supplies the sub volume data (1/24) to (6/24) to the processor element board 1031-1, the sub volume data (7/24) to (12/24) to the processor element board 1031-2, the sub volume data (13/24) to (18/24) to the processor element board 1031-3 and the sub volume data (19/24) to (24/24) to the processor element board 1031-4.

The parent processor element 1041 of the processor element board 1031-1 stores the sub volume data (1/24) supplied thereto into the local memory 1043 of the parent processor element 1041 itself and supplies the sub volume data (2/24) to (6/24) to the child processor elements 1042-1 to 1042-5 in the lower hierarchy, respectively. Consequently, each of the totaling six processor elements incorporated in the processor element board 1031-1 stores one of the sub volume data (1/24) to (6/24) and can individually produce only image data of a portion corresponding to the sub volume data stored in the local memory 1043 built therein.

The parent processor element 1041 of the processor element board 1031-1 produces image data for the leftmost portion (1/24) of the rendering image to be displayed finally; the child processor element 1042-1 produces image data for the second leftmost portion (2/24) of the rendering image; the child processor element 1042-2 produces image data for the third leftmost portion (3/24) of the rendering image; the child processor element 1042-3 produces image data for the fourth leftmost portion (4/24) of the rendering image; the child processor element 1042-4 produces image data for the fifth leftmost portion (5/24) of the rendering image; and the child processor element 1042-5 produces image data for the sixth leftmost portion (6/24) of the rendering image.

Similar processes are performed in parallel also by the processor element boards 1031-2 to 1031-4. In particular, the processor element board 1031-2 produces image data for the 7th to 12th leftmost portions (7/24) to (12/24) of the rendering image. The processor element board 1031-3 produces image data for the 13th to 18th leftmost portions (13/24) to (18/24) of the rendering image. The processor element board 1031-4 produces image data for the 19th to 14th leftmost portions (19/24) to (24/24) of the rendering image. The image data of the portions (1/24) to (24/24) produced by the totaling 24 processor elements incorporated in the multi-processor unit 1026 are stored into the individual local memories 1043.

At step S1012, the parent processor element 1041 of the processor element board 1031-1 performs a superposition process for the image data of the portions (1/24) to (24/24) of the rendering image to be displayed finally, which have been produced by the parent processor element 1041 itself and the child processor elements 1042-1 to 1042-5 in the lower hierarchy, respectively, to produce image data of the leftmost portion (1/4) of the rendering image to be displayed finally, and outputs the produced image data to the rendering module 1056.

Also the processor element boards 1031-2 to 1031-4 perform similar processes. In particular, the processor element board 1031-2 outputs image data of the second leftmost portion (2/4) of the rendering image to be displayed finally to the rendering module 1056. The processor element board 1031-3 outputs image data of the third leftmost portion (3/4) of the rendering image to be displayed finally to the rendering module 1056. Further, the processor element board 1031-4 outputs image data of the rightmost portion (4/4) of the rendering image to be displayed finally to the rendering module 1056.

The rendering module 1056 performs a superposition process for the image data of the portions (1/4) to (4/4) of the rendering image to be displayed finally, which have been inputted from the processor element boards 1031-1 to 1031-4 (in the case of FIG. 24, a process of synthesizing the four divisional side faces of the specimen) to produce the rendering image to be displayed finally as shown in FIG. 11C. Thereafter, the processing advances to step S1005 so that the processes at the steps beginning with step S1005 are thereafter performed. A process where the rendering mode C is applied is executed in such a manner described above.

It is to be noted that, if it is discriminated at step S1010 that the expression (3) representative of the condition for the rendering mode C is not satisfied, then since it can be considered that the capacity V of the volume data is so great that the volume data cannot be processed by the multi-processor unit 1026, the processing is ended without performing plotting of the specimen. The description of the volume rendering process above is ended therewith.

If the processes in the rendering modes A to C described above are compared, then where attention is paid to the number of processing lines which require a communication cost corresponding to the number, in the rendering mode A, one processor element processes y/24 lines; in the rendering mode B, one processor element processes y/6 lines; and in the rendering mode C, one processor element processes y lines. Accordingly, from among the rendering modes A to C, the rendering mode A can execute rendering of a specimen most efficiently and at the highest speed; the rendering mode B exhibits the second highest efficiency; and the rendering mode C executes rendering at the lowest speed.

As described above, in the embodiment described above, since the capacity of sub volumes and the number of processing lines of which one processor element takes charge are distributed in accordance with the capacity I of the volume data and the usable capacity M of the local memory 1043 of each processor element, the image transfer amount between processor elements is minimized.

Further, in the present embodiment, since, when volume data are divided into sub volume data, they are partitioned with planes perpendicular to one of axes of a local coordinate system of the volume data and managed as such, the volume data can be equally divided readily. Further, since the volume data are divided based on the number of processor elements and the number of processor element boards, division of an image and coupling of such divisional images can be performed readily.

Incidentally, as can be recognized apparently from the foregoing description, if the local memory 1043 of each processor element stores a greater amount of volume data to minimize the communication between the parent processor element 1041 and the child processor element 1042, then the processing can be performed at a higher speed. Consequently, not three rendering modes based on the total number of processor elements or the number of processor element boards, but a greater number of rendering modes may be set.

Figure 24A:
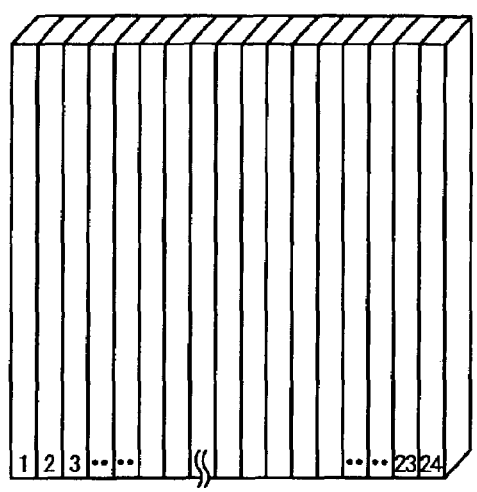
FIGS. 24A, 24B and 24C are diagrammatic views illustrating a process in the rendering mode C.
Figure 24B:
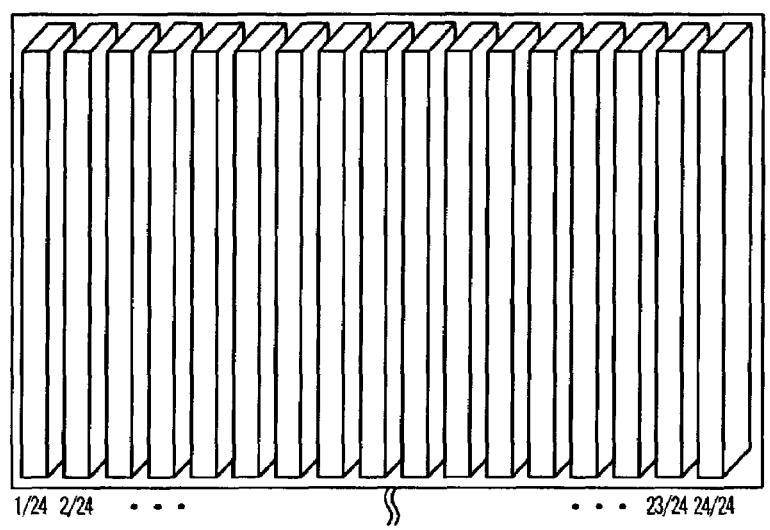
Figure 24C:
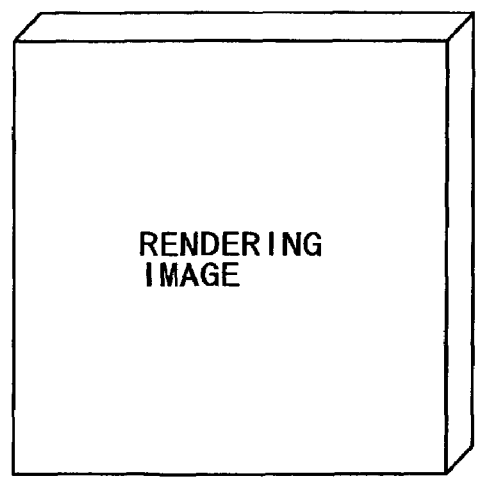

For example, where the capacity of the local memory 1043 is smaller than the amount of sub volume data equal to ¼ the total amount of volume data as seen in FIG. 23A but greater than the amount of sub volume data equal to ¹⁄₂₄ the total amount of volume data as seen in FIG. 24A and the local memory 1043 can store an amount of sub volume data equal to ⅛ the total amount of volume data, for example, six processor elements disposed on each processor element board 31 may be divided into two groups each including three processor elements such that each of three processor elements which belong to the same group stores an amount of sub volume data equal to ⅛ the total amount of volume data. Where this arrangement is employed, since the number of processing lines of which one processor element takes charge is as small as y/3 lines, the processing speed can be increased when compared with that where one processor element takes charge of y lines in the rendering mode C described hereinabove. However, where a greater number of rendering modes are used, there is the possibility that the process of distribution of volume data may be complicated, resulting in difficulty in management of the volume data.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

What is claimed is:

1. An image processing apparatus for producing volume data based on projection image data of a specimen and producing sectional image data of the specimen based on the volume data, the image processing apparatus comprising:

an acquisition unit acquiring the projection image data of the specimen;

a receiving unit receiving from a user at least one of a position of the origin of a coordinate system of the volume data and an inclination of the coordinate system of the volume data, wherein the at least one of the position of the origin and the inclination of the coordinate system are directly input by the user, the volume data including a first plurality of coordinate parameters, wherein the receiving unit further receives trial adjustments to a movement amount and a rotational angle;

a storing unit storing the trial adjustments as final adjustments when desired sectional image data are obtained;

a setting unit setting: (i) first data including the at least one of the position of the origin of a coordinate system of the volume data and the inclination of the coordinate system of the volume data; and (ii) second data including the movement amount and the rotational angle associated with the final adjustments;

a production unit producing the volume data based on the projection image data acquired by said acquisition unit in accordance with the first data and the second data, wherein said production unit includes:

(a) a converting unit converting the first plurality of coordinate parameters of the volume data into a second plurality of coordinate parameters of the projection image data by multiplying the first plurality of coordinate parameters by:

(i) a central point movement transform matrix, (ii) a center axis alignment transform matrix, (iii) an axial rotation transform matrix, and (iv) a reverse projection transform matrix, (b) a filtering unit performing a predetermined filtering process for the projection image data; and a readout unit reading out, from among voxels which compose the volume data produced by said production unit, those voxels which are positioned on a plane perpendicular to one of coordinate axes of the coordinate system of the volume data and regarding the read out voxels as pixels to produce the sectional image data.

2. The image processing apparatus according to claim 1, wherein said production unit includes:

an addition unit adding, from among the pixels of the plurality of projection image data filtered by said filtering unit, those pixels which correspond to the coordinate parameter of the projection image data converted by said conversion unit to produce the voxels of the volume data.

3. An image processing method for operating an image processing apparatus for producing volume data based on projection image data of a specimen and producing sectional image data of the specimen based on the volume data, the image processing method comprising:

an acquisition step of acquiring the projection image data of the specimen;

a receiving step of receiving from a user at least one of a position of the origin of a coordinate system of the volume data and an inclination of the coordinate system of the volume data, wherein the at least one of the position of the origin and the inclination of the coordinate system are directly input by the user, the volume data including a first plurality of coordinate parameters, the receiving step further receiving trial adjustments to a movement amount and a rotational angle;

a storing step of storing the trial adjustments as final adjustments when desired sectional image data are obtained;

a setting step of setting: (i) first data including the at least one of the position of the origin of a coordinate system of the volume data and the inclination of the coordinate system of the volume data; and (ii) second data including the movement amount and the rotational angle associated with the final adjustments;

a production step, performed by the image processing apparatus, of producing the volume data based on the projection image data acquired by the process at the acquisition step in accordance with the first data and the second data, wherein the production step includes converting the first plurality of coordinate parameters of the volume data into a second plurality of coordinate parameters of the projection data by multiplying the first plurality of coordinate parameters by:
  (i) a central point movement transform matrix,
  (ii) a center axis alignment transform matrix,
  (iii) an axial rotation transform matrix, and
  (iv) a reverse projection transform matrix;
a readout step of reading out, from among voxels which compose the volume data produced by the process at the production step, those voxels which are positioned on a plane perpendicular to one of coordinate axes of the coordinate system of the volume data and regarding the read out voxels as pixels to produce the sectional image data.

4. A computer readable medium encoded with a computer program for causing a computer, which controls an image processing apparatus for producing volume data based on projection image data of a specimen and producing sectional image data of the specimen based on the volume data, to execute a process, the computer readable medium comprising:
  an acquisition step of acquiring the projection image data of the specimen;
  a receiving step of receiving from a user at least one of a position of the origin of a coordinate system of the volume data and an inclination of the coordinate system of the volume data, wherein the at least one of the position of the origin and the inclination of the coordinate system are directly input by the user, the volume data including a first plurality of coordinate parameters the receiving step further receiving trial adjustments to a movement amount and a rotational angle;
  a storing step of storing the trial adjustments as final adjustments when desired sectional image data are obtained;
  a setting step of setting: (i) first data including the at least one of the position of the origin of a coordinate system of the volume data and the inclination of the coordinate system of the volume data;(ii) second data including the movement amount and the rotational angle associated with the final adjustments;
  a production step of producing the volume data based on the projection image data acquired by the process at the acquisition step in accordance with the first data and the second data, wherein the production step includes converting the first plurality of coordinate parameters of the volume data into a second plurality of coordinate parameters of the projection data by multiplying the first plurality of coordinate parameters by:
    (i) a central point movement transform matrix,
    (ii) a center axis alignment transform matrix,
    (iii) an axial rotation transform matrix, and
    (iv) a reverse projection transform matrix;
  a readout step of reading out, from among voxels which compose the volume data produced by the process at the production step, those voxels which are positioned on a plane perpendicular to one of coordinate axes of the coordinate system of the volume data and regarding the read out voxels as pixels to produce the sectional image data.

5. An image processing system comprising:
  a first image processing apparatus producing volume data based on projection image data of a specimen and producing sectional image data of the specimen based on the volume data, said first image processing apparatus including:
    (a) an acquisition unit acquiring the projection image data of the specimen;
    (b) a receiving unit receiving from a user at least one of a position of an origin of a coordinate system of the volume data and an inclination of the coordinate system of the volume data, wherein the at least one of the position of the origin and the inclination of the coordinate system is directly input by the user, the volume data including a first plurality of coordinates, wherein the receiving unit further receives trial adjustments to a movement amount and a rotational angle;
    (c) a storing unit storing the trial adjustments as final adjustments when desired sectional image data are obtained;
    (d) a setting unit setting: (i) first data including the at least one of the position of the origin of a coordinate system of the volume data and the inclination of the coordinate system of the volume data; and (ii) the movement amount and the rotational angle associated with the final adjustments;
    (e) a production unit producing the volume data based on the projection image data acquired by said acquisition unit in accordance with the first data and the second data, wherein said production unit includes a converting unit converting the first plurality of coordinate parameters of the volume data into a second plurality of coordinate parameters of the projection image data by multiplying the first plurality of coordinate parameters by:
      (i) a central point movement transform matrix,
      (ii) a center axis alignment transform matrix,
      (iii) an axial rotation transform matrix, and
      (iv) a reverse projection transform matrix;
    (f) a readout unit reading out, from among voxels which compose the volume data produced by said production unit, those voxels which are positioned on a plane perpendicular to one of coordinate axes of the coordinate system of the volume data and regarding the read out voxels as pixels to produce the sectional image data; and
  a second image processing apparatus producing a three-dimensional rendering image corresponding to the specimen using a multi-processor unit in which a plurality of parent processors are associated with a plurality of child processors which can perform parallel processing are incorporated.

6. The image processing system according to claim 5, wherein said second image processing apparatus includes:
  an acquisition unit acquiring a capacity of volume data corresponding to the specimen and a capacity of memories corresponding to said processors;
  a selection unit selecting a static processing mode based on the capacity of the volume data, capacity of rendering image data to be produced and the capacity of said memories acquired by said acquisition unit;
  a division unit dividing the volume data in accordance with the processing mode selected by said selection unit and supplying the divided volume data to corresponding ones of said parent processors wherein said parent processors supply the divided volume data to corresponding ones of said child processors;
  a determination unit determining a scan line number of which said processors should take charge in accordance with the processing mode selected by said selection unit;

a coupling unit coupling image data from child processors and from an associated parent processor resulting in a coupled image data; and an outputting unit outputting the coupled image data from the parent processor.

7. The image processing system of claim 6, wherein the plurality of parent processors are associated with a plurality child processors in a tree structure.

8. An image processing apparatus for producing a three-dimensional rendering image corresponding to a specimen using a multi-processor unit in which a plurality of parent processors are associated with a plurality child processors which can perform parallel processing are incorporated, the image processing apparatus comprising:

an acquisition unit acquiring:
(i) a capacity of volume data corresponding to the specimen;
(ii) a capacity of rendering image data corresponding to the specimen;
(iii) a number of the plurality of parent processors and the plurality of child processors, the plurality of parent processors including:
(a) a first parent processor which corresponds to a first memory; and
(b) a second parent processor which corresponds to a second memory,
the plurality of child processors including:
(a) a first child processor which corresponds to a third memory;
(b) a second child processor which corresponds to a fourth memory;
(c) a third child processor which corresponds to a fifth memory; and
(d) a fourth child processor which corresponds to a sixth memory;
the first parent processor being associated with the first child processor and the second child processor, the second parent processor being associated with the third child processor and the fourth child processor; and
(iv) a usable capacity of the first memory, the second memory, the third memory, the fourth memory, the fifth memory, and the sixth memory;

a selection unit selecting a static processing mode based on:
(i) the capacity of the volume data corresponding to the specimen;
(ii) the capacity of rendering image data corresponding to the specimen;
(iii) the usable capacity of the first memory, the second memory, the third memory, the fourth memory, the fifth memory, and the sixth memory; and
(iv) the number of the plurality of parent processors and the plurality of child processors;

a division unit performing: (i) dividing the volume data corresponding to the specimen in accordance with the static processing mode selected by said selection unit to provide a first divided volume data corresponding to the specimen and a second divided volume data corresponding to the specimen; and (ii) supplying the first divided volume data corresponding to the specimen to the first parent processor and the second divided volume data to the second parent processor, wherein the first parent processor divides the first divided volume data to provide a third divided volume data which is supplied to the first child processor and a fourth divided volume data which is supplied to the second child processor, wherein the second parent processor divides the second divided volume data to provide a fifth divided volume data which is supplied to the third child processor and a sixth divided volume data which is supplied to the fourth child processor;

a determination unit determining a scan line number of which said plurality of parent processors and said plurality of child processors should take charge in accordance with the processing mode selected by said selection unit;

a coupling unit coupling image data results corresponding to the specimen from the first parent processor, the second parent processor, the first child processor, the second child processor, the third child processor, and the fourth child processor resulting in a coupled image data corresponding to the specimen; and an outputting unit outputting the coupled image data corresponding to the specimen from the first parent processor and the second parent processor.

9. The image processing apparatus according to claim 8, wherein said acquisition unit further acquires at least one of the number of processor unit boards which compose said multi-processor unit and the total number of said processors incorporated in said multi-processor unit, and said selection unit selects the processing mode based also on at least one of the number of said processor unit boards and the total number of said processors acquired by said acquisition unit.

10. The image processing apparatus according to claim 9, wherein said division unit divides the volume data and/or said determination unit determines the scan line number of which said processors take charge in accordance with the number of said processor unit boards or the total number of said processors acquired by said acquisition unit.

11. The image processing apparatus of claim 8, wherein the plurality of parent processors are associated with a plurality child processors in a tree structure.

12. An image processing method for operating an image processing apparatus for producing a three-dimensional rendering image corresponding to a specimen using a multi-processor unit in which a plurality of parent processors are associated with a plurality of child processors which can perform parallel processing are incorporated, the image processing method comprising:

an acquisition step of acquiring:
(i) a capacity of volume data corresponding to the specimen; and
(ii) a capacity of rendering image data corresponding to the specimen;
(iii) a number of the plurality of parent processors and the plurality of child processors,
the plurality of parent processors including:
(a) a first parent processor which corresponds to a first memory; and
(b) a second parent processor which corresponds to a second memory,
the plurality of child processors including:
(a) a first child processor which corresponds to a third memory;
(b) a second child processor which corresponds to a fourth memory;
(c) a third child processor which corresponds to a fifth memory;
(d) a fourth child processor which corresponds to a sixth memory;
(iv) a usable capacity of the first memory, the second memory, the third memory, the fourth memory, the fifth memory, and the sixth memory;

a selection step, performed by the image processing apparatus, of selecting a static processing mode based on:
(i) the capacity of the volume data corresponding to the specimen;
(ii) the capacity of rendering image data corresponding to the specimen;
(iii) the usable capacity of the first memory, the second memory, the third memory, the fourth memory, the fifth memory, and the sixth memory; and
(iv) the number of the plurality of parent processors and the plurality of child processors;

a division step, performed by the image processing apparatus, of: (i) dividing the volume data in accordance with the static processing mode selected by the process at the selection step to provide a first divided volume data corresponding to the specimen and a second divided volume data corresponding to the specimen; and (ii) supplying the first divided volume data corresponding to the specimen to the first parent processor and the second divided volume data to the second parent processor, wherein the first parent processor divides the first divided volume data to provide a third divided volume data which is supplied to the first child processor and a fourth divided volume data which is supplied to the second child processor, wherein the second parent processor divides the second divided volume data to provide a fifth divided volume data which is supplied to the third child processor and a sixth divided volume data which is supplied to the fourth child processor;

a determination step of determining a scan line number of which said plurality of parent processors and plurality of child processors should take charge in accordance with the processing mode selected by the process at the selection step;

a coupling step of coupling image data results corresponding to the specimen from the first parent processor, the second parent processor, the first child processor, the second child processor, the third child processor, and the fourth child processor resulting in a coupled image data; and an outputting step for outputting the coupled image data corresponding to the specimen from the first parent processor and the second parent processor.

13. The image processing method of claim 12, wherein the plurality of parent processors are associated with a plurality child processors in a tree structure.

14. A computer readable medium encoded with a computer program for causing a computer, which produces a three-dimensional rendering image corresponding to a specimen using a multi-processor unit in which a plurality of processors which can perform parallel processing are incorporated, to execute a process, the computer readable medium comprising:

an acquisition step of acquiring:
(i) a capacity of volume data corresponding to the specimen;
(ii) a capacity of rendering image data corresponding to the specimen;
(iii) a number of the plurality of parent processors and the plurality of child processors, the plurality of parent processors including:
(a) a first parent processor which corresponds to a first memory; and
(b) a second parent processor which corresponds to a second memory, the plurality of child processors including:
(a) a first child processor which corresponds to a third memory;
(b) a second child processor which corresponds to a fourth memory;
(c) a third child processor which corresponds to a fifth memory; and
(d) a fourth child processor which corresponds to a sixth memory;

the first parent processor being associated with the first child processor and the second child processor, and the second parent processor being associated with the third child processor and the fourth child processor; and (iv) a usable capacity of the first memory, the second memory, the third memory, the fourth memory, the fifth memory, and the sixth memory;

a selection step, performed by the image processing apparatus, of selecting a static processing mode based on:
(i) the capacity of the volume data corresponding to the specimen;
(ii) the capacity of rendering image data corresponding to the specimen;
(iii) the usable capacity of the first memory, the second memory, the third memory, the fourth memory, the fifth memory, and the sixth memory; and
(iv) the number of the plurality of parent processors and the plurality of child processors;

a division step, performed by the image processing apparatus, of: (i) dividing the volume data corresponding to the specimen in accordance with the static processing mode selected by the process at the selection step to provide a first divided volume data corresponding to the specimen and a second divided volume data corresponding to the specimen; and (ii) supplying the first divided volume data corresponding to the specimen to the first parent processor and the second divided volume data to the second parent processor, wherein the first parent processor divides the first divided volume data to provide a third divided volume data which is supplied to the first child processor and a fourth divided volume data which is supplied to the second child processor, wherein the second parent processor divides the second divided volume data to provide a fifth divided volume data which is supplied to the third child processor and a sixth divided volume data which is supplied to the fourth child processor;

a determination step of determining a scan line number of which said plurality of parent processors and said plurality of child processors should take charge in accordance with the processing mode selected by the process at the selection step;

a coupling step of coupling image data results corresponding to the specimen from the first parent processor, the second parent processor, the first child processor, the second child processor, the third child processor, and the fourth child processor resulting in a coupled image data; and an outputting step for outputting the coupled image data corresponding to the specimen from the first parent processor and the second parent processor.

15. The computer readable medium of claim 14, wherein the plurality of parent processors are associated with a plurality child processors in a tree structure.

16. An image processing system comprising:

a first image processing apparatus producing volume data based on projection image data of a specimen and producing sectional image data of the specimen based on the volume data; and a second image processing apparatus producing a three-dimensional rendering image corresponding to the specimen using a multi-processor unit in which a plurality of parent processors are associated with a plurality of child processors which can perform parallel processing are incorporated, said second image processing apparatus including:

(a) an acquisition unit acquiring:
  (i) a capacity of volume data corresponding to the specimen;
  (ii) a capacity of rendering image data corresponding to the specimen;
  (iii) a number of the plurality of parent processors and the plurality of child processors, the plurality of parent processors including:
     (a) a first parent processor which corresponds to a first memory; and
     (b) a second parent processor which corresponds to a second memory,
  the plurality of child processors including:
     (a) a first child processor which corresponds to a third memory;
     (b) a second child processor which corresponds to a fourth memory;
     (c) a third child processor which corresponds to a fifth memory; and
     (d) a fourth child processor which corresponds to a sixth memory;
  the first parent processor being associated with the first child processor and the second child processor, the second parent processor being associated with the third child processor and the fourth child processor; and
  (iv) a usable capacity of the first memory, the second memory, the third memory, the fourth memory, the fifth memory, and the sixth memory;

(b) a selection unit selecting a static processing mode based on:
  (i) the capacity of the volume data corresponding to the specimen;
  (ii) the capacity of rendering image data corresponding to the specimen;
  (iii) the usable capacity of the first memory, the second memory, the third memory, the fourth memory, the fifth memory, and the sixth memory; and
  (iv) the number of the plurality of parent processors and the plurality of child processors (c) a division unit performing: (i) dividing the volume data corresponding to the specimen in accordance with the static processing mode selected by said selection unit to provide a first divided volume data corresponding to the specimen and a second divided volume data corresponding to the specimen; and (ii) supplying the first divided volume data corresponding to the specimen to the first parent processor and the second divided volume data to the second parent processor, wherein the first parent processor divides the first divided volume data to provide a third divided volume data which is supplied to the first child processor and a fourth divided volume data which is supplied to the second child processor, wherein the second parent processor divides the second divided volume data to provide a fifth divided volume data which is supplied to the third child processor and a sixth divided volume data which is supplied to the fourth child processor;

(d) a determination unit determining a scan line number of which said plurality of parent processors and said plurality of child processors should take charge in accordance with the processing mode selected by said selection unit;

(e) a coupling unit for coupling image data results corresponding to the specimen from the first parent processor, the second parent processor, the first child processor, the second child processor, the third child processor, and the fourth child processor resulting in a coupled image data corresponding to the specimen; and (f) an outputting unit outputting the coupled image data corresponding to the specimen from the first parent processor and the second parent processor.

17. The image processing system of claim 16, wherein the plurality of parent processors are associated with a plurality child processors in a tree structure.

* * * * *